US008072486B2

(12) United States Patent
Namba et al.

(10) Patent No.: US 8,072,486 B2
(45) Date of Patent: Dec. 6, 2011

(54) CAMERA DEVICE, LIQUID LENS, AND IMAGE PICKUP METHOD

(75) Inventors: Takaaki Namba, Aichi (JP); Masakazu Mimura, Osaka (JP)

(73) Assignee: Panasonic Corporation, Osaka (JP)

( * ) Notice: Subject to any disclaimer, the term of this patent is extended or adjusted under 35 U.S.C. 154(b) by 545 days.

(21) Appl. No.: 12/373,606

(22) PCT Filed: Jul. 31, 2007

(86) PCT No.: PCT/JP2007/064953
§ 371 (c)(1),
(2), (4) Date: Jan. 13, 2009

(87) PCT Pub. No.: WO2008/016035
PCT Pub. Date: Feb. 7, 2008

(65) Prior Publication Data
US 2009/0174765 A1  Jul. 9, 2009

(30) Foreign Application Priority Data
Aug. 1, 2006   (JP) .................................. 2006-209680

(51) Int. Cl.
*H04N 15/00* (2006.01)
(52) U.S. Cl. ........................................................ 348/46
(58) Field of Classification Search ............... 348/42–60
See application file for complete search history.

(56) References Cited

U.S. PATENT DOCUMENTS

| 6,437,920 | B1 * | 8/2002 | Wohlstadter | 359/626 |
| 6,864,910 | B1 | 3/2005 | Ogino et al. | |
| 7,411,733 | B2 * | 8/2008 | Toyoda et al. | 359/619 |
| 2005/0053274 | A1 * | 3/2005 | Mayer et al. | 382/154 |
| 2005/0111842 | A1 | 5/2005 | Nakagawa | |
| 2005/0231810 | A1 | 10/2005 | Wohlstadter | |
| 2006/0047039 | A1 | 3/2006 | Kato et al. | |
| 2007/0090275 | A1 * | 4/2007 | Toyoda et al. | 250/208.1 |

(Continued)

FOREIGN PATENT DOCUMENTS

DE     102005005933     8/2006

(Continued)

OTHER PUBLICATIONS

International Search Report issued Oct. 16, 2007 in the International (PCT) Application of which the present application is the U.S. National Stage.

(Continued)

*Primary Examiner* — Jerry Dennison
(74) *Attorney, Agent, or Firm* — Wenderoth, Lind & Ponack, L.L.P.

(57) ABSTRACT

A camera device is provided which has a compound eye structure only by a liquid lens unit and a control unit without requiring a plurality of lenses to be mounted in advance and is capable of taking a three-dimensional stereoscopic video image. In addition, a compact and lightweight three-dimensional stereoscopic camera is provided which can be switched to take a two-dimensional planar image or to take a three-dimensional stereoscopic image only by an electronic control with no need for a movable mechanism and can reduce the power consumption and improve the reliability. A camera device comprises a liquid lens (182) switchable to a single eye lens and a compound eye lens; and a switching unit for switching the liquid lens (182) to the single eye lens to take a planar image and switching the liquid lens (182) to the compound eye lens to take a stereoscopic image.

15 Claims, 17 Drawing Sheets

U.S. PATENT DOCUMENTS

| | | | |
|---|---|---|---|
| 2007/0097512 A1* | 5/2007 | Toyoda et al. | 359/626 |
| 2008/0310031 A1 | 12/2008 | Mohr et al. | |
| 2010/0066812 A1* | 3/2010 | Kajihara et al. | 348/46 |

FOREIGN PATENT DOCUMENTS

| | | |
|---|---|---|
| EP | 1 085 769 | 3/2001 |
| GB | 2 403 814 | 1/2005 |
| JP | 2000-036968 | 2/2000 |
| JP | 2001-16617 | 1/2001 |
| JP | 2001-142166 | 5/2001 |
| JP | 2003-50303 | 2/2003 |
| JP | 2004-297540 | 10/2004 |
| JP | 2004-311666 | 11/2004 |
| JP | 2005-185090 | 7/2005 |
| JP | 2006-064946 | 3/2006 |
| JP | 2007-025601 | 2/2007 |
| JP | 2007-520166 | 7/2007 |
| WO | 03/071335 | 8/2003 |
| WO | 2005/072370 | 8/2005 |
| WO | 2007/010782 | 7/2006 |

OTHER PUBLICATIONS

Extended European Search Report issued Apr. 8, 2009 for the corresponding European application.

* cited by examiner

F I G. 1 4
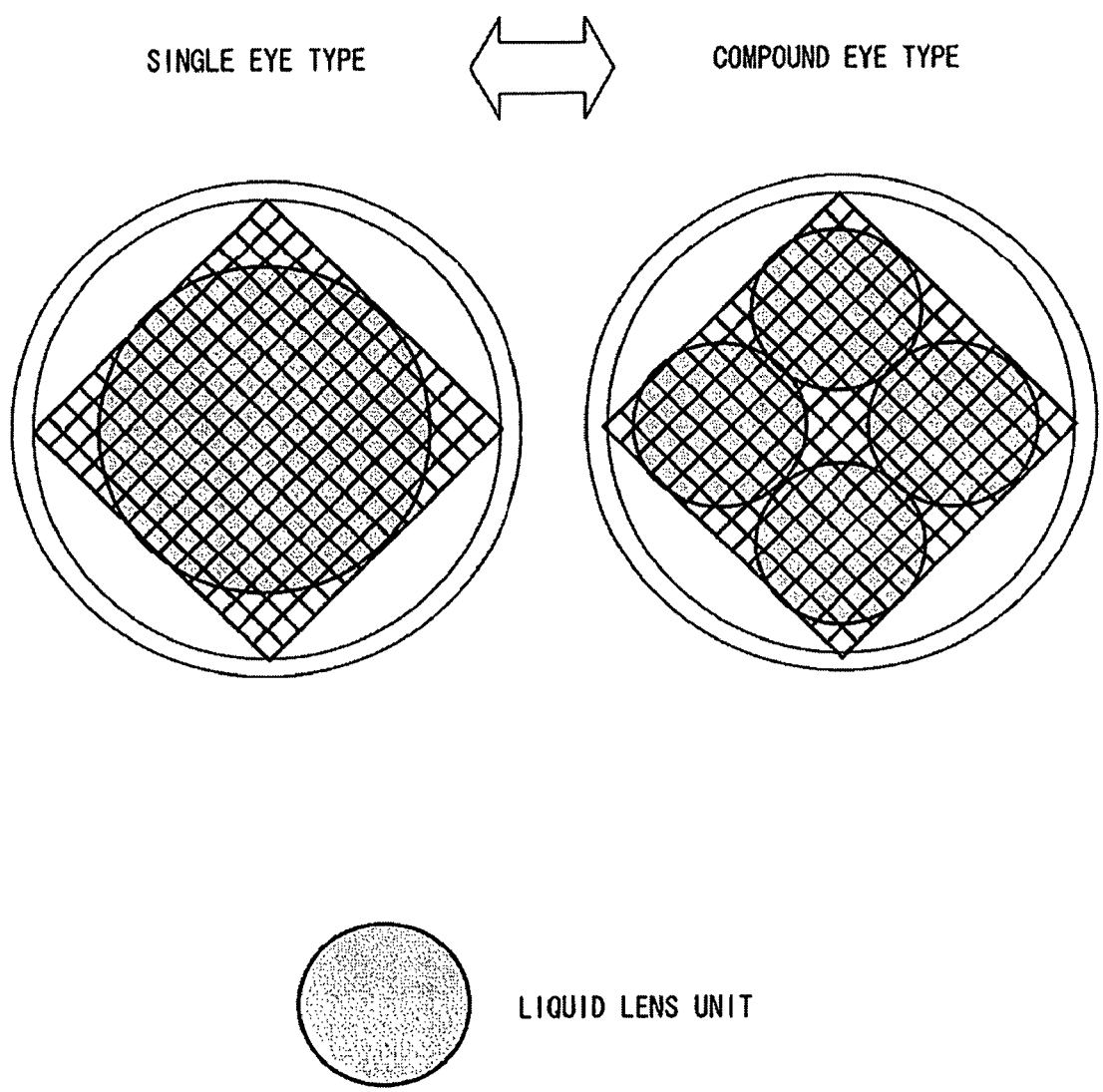

CAMERA DEVICE, LIQUID LENS, AND IMAGE PICKUP METHOD

TECHNICAL FIELD

The present invention relates to a camera device for forming an image on an image pickup element by a lens and electronically obtaining and recording information on the image. More specifically, the present invention relates to a camera device capable of obtaining both of planar image information and stereoscopic image information, and also capable of obtaining and recording either one of, or both of, a still image and a moving image.

BACKGROUND ART

A conventional camera capable of obtaining planar image information and stereoscopic image information is, for example, a 3D camera described in Patent Document 1 specified below.

FIG. 10 is an external view of a conventional 3D camera 910 including two camera heads, i.e., a fixed head 915 and a movable head 916, and FIG. 11 is a block structural diagram of a main part of the 3D camera 910.

The fixed head 915 is fixed to a main body of the 3D camera 910, whereas the movable head 916 can be slid and thus moved by operating a moving button 912. In FIG. 10, the movable head 916 is shown in the state of having been moved to an outermost position in a movable range thereof. In FIG. 11, reference numeral 916 represents the movable head in the state of having been moved to the outermost position in the movable range thereof, and reference numeral 916' represents the movable head in the state of having been moved to an innermost position in the movable range thereof.

The fixed head 915 and the movable head 916 respectively include a fixed head lens 917 and a movable head lens 918. The fixed head lens 917 and the movable head lens 918 are respectively zoomed in or out by a zoom motor 926 and a zoom motor 929 described later.

The fixed head 915 and the movable head 916 respectively have an optical axis 937 and an optical axis 938 which are parallel to each other regardless of a gap therebetween. The fixed head 915 and the movable head 916 each include a charge coupled device (CCD) sensor, which is an image pickup element. The fixed head 915 and the movable head 916 are substantially identical with each other, and located in a common plane which is vertical to the optical axis 937 and the optical axis 938.

The movable head 916 is structured to be slidable and thus movable in the state where the optical axis 937 and the optical axis 938 are kept parallel to each other and both of the movable head 916 and the fixed head 915 are located in a plane vertical to these two optical axes.

The fixed head 915 and the movable head 916 are controllable by a user. For example, the user may press the moving button 912 located in an upper part of the movable head 916 with his/her finger to slide and thus mechanically move the movable head 916. Alternatively, the user may rotate a dial 913 connected to the movable head 916 via a worm gear to adjust the gap between the fixed head 915 and the movable head 916. In another example, the user may rotate a motor with an electronically controllable button switch or the like, such as a rightward moving button and a leftward moving button, to move the movable head 916.

The position of the movable head 916 is measured by a position encoder 925 and is input to a vision feedback unit 932, which is a circuit for determining a field of view and a focal distance of each of the fixed head lens 917 and the movable head lens 918. The position encoder 925 includes a linear potentiometer for detecting the position of the movable head 916. In another example, the movable head 916 may be moved by a stepper motor and the position thereof may be measured by counting the number of steps of the motor.

The vision feedback unit 932 controls a zoom control unit 924 in order to adjust the focal distance of each of the fixed head lens 917 and the movable head lens 918. The zoom control unit 924 controls the zoom motor 926 and the zoom motor 929. At this point, the focal distances are controlled to maintain the same value with each other.

The vision feedback unit 932 also receives detailed information on a display unit 933 for displaying a captured image from a display unit element determination unit 930. This information is, for example, a preset value indicating a screen size or a prescribed observing distance of the display unit 933. Alternatively, the user may input appropriate data as such information.

The vision feedback unit 932 further receives subject depth information from a subject depth determination unit 931. The subject depth determination unit 931, in a simplest structure thereof, may merely set an apocenter to infinity and set a pericenter to a minimum focal distance of the camera. In a more advanced example, for instance, where the camera is of an autofocus type, one or more depth range limit values may be measured by an autofocus sensor. In order to maximize the flexibility, the auto focus sensor is directed to the closest point or the farthest point in the image to be captured and thus accurately measured distance data is supplied to the vision feedback unit 932.

In addition to controlling the zoom motor 926 and the zoom motor 929 to adjust the focal distance of each of the fixed head lens 917 and the movable head lens 918, the zoom control unit 924 supplies the vision feedback unit 932 with information indicating whether or not the camera of the fixed head 915 and the camera of the movable head 916 operate within tolerable conditions. For example, when a maximum parallax condition is exceeded, the zoom control unit 924 notifies the vision feedback unit 932 that an image which will be captured with the current camera setting is inappropriate. The vision feedback unit 932 notifies the user of this through information which is displayed on the display unit 933. Similarly, when the depth of a captured image is too small, the zoom control unit 924 may provide a display indicating that good 3D perception will not be obtained.

An image captured by the image pickup element of each of the fixed head 915 and the movable head 916 is sent to an image processing unit 934. The image processing unit 934 processes the captured image based on data sent from the zoom control unit 924 or the vision feedback unit 932, and displays the resultant image on the display unit 933.

Alternatively, a post-processing or pre-processing image may be stored on a fixed or detachable memory 935. In the case of the detachable memory 935, the memory 935 may be transferred to another device to transfer the image to the another device, for example, a computer or a three-dimensional projector. In this manner, the image may be subjected to other types of processing or stereoscopic display.

In the case where, for example, the 3D camera 910 includes a communication unit (not shown), the communication unit may be used to transfer the image to an other device, for example, a computer or a three-dimensional projector. In this manner, the image may be subjected to other types of processing or stereoscopic display.

The vision feedback unit 932 receives information indicating the position of the movable head 916 and the gap between the fixed head 915 and the movable head 916 from the position encoder 925. The vision feedback unit 932 also receives information indicating the focal distance of each of the lens of the fixed head 915 and the lens of the movable head 916 from the zoom control unit 924, and determines the field of view of the camera based on both of the information regarding the focal distances and the information regarding the gap between the fixed head 915 and the movable head 916. For example, where the fixed head 915 and the movable head 916 have a maximum gap therebetween, the focal distances of the fixed head lens 917 and the movable head lens 918 are adjusted such that the camera has the widest field of view. By contrast, where the gap between the fixed head 915 and the movable head 916 is set to be minimum, the fixed head lens 917 and the movable head lens 918 are controlled such that the camera has the narrowest field of view within a usable range.

conventional liquid lens which uses a liquid as a lens material and is capable of changing a focal distance thereof by an electronic control is, for example, a liquid microlens described in Patent Document 2 specified below.

FIG. 12 is a cross-sectional view of such a conventional liquid microlens 960.

The liquid microlens 960 includes a droplet 962 formed of a transparent liquid. The droplet 962 has a diameter of several micrometers to several millimeters. The droplet 962 is located on a transparent substrate 964. The transparent substrate 964 is hydrophobic or has a hydrophobic coating layer. Accordingly, the droplet 962 has a very strong interface tension to the transparent substrate 964, and if being left without being processed, tends to be shaped spherical as a result of being "repelled" by the transparent substrate 964. However, by an electromagnetic control of applying a predetermined voltage between the droplet 962 and the transparent substrate 964, the interface tension of the droplet 962 to the transparent substrate 964 can be weakened by an electron wettability phenomenon. As a result, a lens in which an angle of an end of the droplet 962 with respect to the transparent substrate 964 is θ can be formed.

The transparent liquid which forms the droplet 962 and the transparent substrate 964 are transparent with respect to light having a wavelength in a certain range including visual light rays.

Light rays 966, which are incident on the liquid microlens 960 and are vertical to the transparent substrate 964 and parallel to each other, pass the liquid microlens 960 and are collected to a focal point 968 which is distance f away from the contact face of the droplet 962 and the transparent substrate 964.

Contact angle "θ" between the droplet 962 and the transparent substrate 964 is determined by interface tension "Y" mentioned below (usually measured with millinewton per meter (mN/m)).

In the liquid microlens 960, the angle θ is represented by expression 1 where $Y_{S-V}$ is the interface tension between the transparent substrate 964 and air (or a gas or another fluid) enclosing the transparent substrate 964, $Y_{L-V}$ is the interface tension between the droplet 962 and air (or a gas or another fluid) enclosing the droplet 962, and $Y_{S-L}$ is the interface tension between the transparent substrate 964 and the droplet 962.

$$\cos(\theta) = \frac{Y_{S-V} - Y_{S-L}}{Y_{L-V}} \quad \text{[Expression 1]}$$

Where the volume of the droplet 962 is V, the radius of curvature "R" of the curved surface of the droplet 962 is represented by expression 2.

$$R^3 = \frac{3 \cdot V}{\pi(1 - \cos\theta)(2 - \cos^2\theta - \cos\theta)} \quad \text{[Expression 2]}$$

The focal distance f of the liquid microlens 960 is the function of the radius R and the refractive index "n".

Where $n_L$ is the refractive index of the droplet 962 and $n_V$ is the refractive index of air (or a gas or another fluid) enclosing the droplet 962, the focal distance f is represented by expression 3.

$$f = \frac{R}{n_L - n_V} \quad \text{[Expression 3]}$$

Since a top surface and a bottom surface of the transparent substrate 964 are parallel to each other, refractive index thereof is not an issue. Where the volume V of the droplet 962, the refractive index $n_L$ of the droplet 962, and the refractive index $n_V$ of the air enclosing the droplet 962 are assumed to be constant (usually, V, $n_L$ and $n_V$ are considered to be constant), the focal distance of the liquid microlens 960 is the function of only the contact angle θ.

FIG. 13 is a schematic view of an electronic wettability phenomenon. By this electronic wettability phenomenon, contact angle $\theta_1$-$\theta_2$ between the droplet 962, which is a conductive fluid, and a dielectric insulating layer 974 having a dielectric constant of "$\epsilon_v$" and a thickness of "d" can be reversibly changed. Therefore, a liquid microlens, the focal distance of which is reversibly changeable, can be provided.

As shown in FIG. 13, a metal electrode 976 is located below the dielectric insulating layer 974, and is insulated by the dielectric insulating layer 974 from a droplet 972, which is a conductive fluid. The droplet 972 is, for example, a small water drop, and the dielectric insulating layer 974 is, for example, a thin film or a thin plate formed of Teflon (registered trademark)/Parylene as a material.

Without any voltage difference between the droplet 972 and the metal electrode 976, the droplet 972 maintains a shape defined by the volume of the droplet 972 and the contact angle $\theta_1$. The contact angle $\theta_1$ is determined by the interface tension, as described above.

As described above, since the dielectric insulating layer 974 is hydrophobic, the droplet 972 tends to be shaped spherical as a result of being "repelled" by the transparent substrate 974.

The shape of a droplet 978 represented by the dashed line shows the following state. As a result of a voltage V being applied between the metal electrode 976 and the droplet 972, an electronic wettability phenomenon occurs, and the hydrophobicity of the dielectric insulating layer 974 with respect to the droplet 972 is weakened (the hydrophilicity thereof is intensified); and therefore, the droplet 972 is uniformly diffused with respect to the dielectric insulating layer 974. The voltage V at this point is in the range of several volts to several hundred volts, and the polarity is irrelevant. By applying the voltage V between the metal electrode 976 and the droplet 972, the contact angle is decreased from $\theta_1$ to $\theta_2$. A diffusion amount determined by the difference between $\theta_1$ and $\theta_2$ is the function of the voltage V, and the contact angle $\theta_2$ is represented by expression 4.

$$\cos\theta(V) = \cos\theta(V=0) + \frac{\varepsilon_0 \varepsilon_\gamma}{2dY_{L-V}} V^2 \quad \text{[Expression 4]}$$

In expression 4, θ (V=0) is the contact angle between the dielectric insulating layer 974 and the droplet 972 when no voltage is applied between the droplet 972 and the metal electrode 976. $Y_{L-V}$ is the interface tension between the droplet 972 and air (or a gas or another fluid) enclosing the droplet 972. $\varepsilon_\gamma$ is the dielectric constant of the insulating layer. $\varepsilon_0$ is the permeability of vacuum, i.e., $8.85 \times 10^{-12}$ F/m.

Utilizing such an electronic wettability phenomenon, a liquid microlens, the focal distance of which is reversibly changeable, can be formed.

Patent Document 1: Japanese Laid-Open Patent Publication No. 2001-142166

Patent Document 2: Japanese Laid-Open Patent Publication No. 2003-050303

DISCLOSURE OF THE INVENTION

Problems to be Solved by the Invention

However, such a conventional camera device capable of obtaining both of a planar image and a stereoscopic image requires separate lenses for obtaining a planar image with a single eye lens and for obtaining a stereoscopic image with a compound eye lens. In addition, in order to change the gap between the two points of view, such a conventional camera device requires mechanisms or components for moving the lenses to be mounted thereon.

These issues cause manufacturers problems that, for example, many components are necessary, the number of assembly steps is increased, the reliability is decreased, and the cost is increased.

For users also, the above-mentioned issues increase the size or weight of the camera or reduce the ease of use. Such a situation inhibits this type of cameras from spreading.

The above-described liquid microlens can reversibly change the focal distance of the lens by an electromagnetic control, but this only is not sufficient to provide both of a planar image and a stereoscopic image.

Solution to the Problems

A first aspect of the present invention is directed to a camera device. The camera device according to the present invention comprises a liquid lens switchable to a single eye lens and a compound eye lens; and a switching unit for switching the liquid lens to the single eye lens to take a planar image and switching the liquid lens to the compound eye lens to take a stereoscopic image.

Owing to this, it is made possible to provide a three-dimensional stereoscopic camera device capable of realizing a compound eye structure and taking a moving image or a still image without a plurality of lenses being mounted in advance. A switching operation to take a two-dimensional planar image or to take a three-dimensional stereoscopic image can be performed without a movable mechanism, and therefore the power consumption can be reduced and the reliability can be improved. In addition, a compact and lightweight three-dimensional stereoscopic camera device can be provided.

It is preferable that the switching unit, when switching the liquid lens to the compound eye lens, changes the number and locations of optical axes thereof.

Owing to this, it is made possible to take an image seen from a plurality of points of view by one liquid lens, and the number and the position of the points of view can be changed. Various stereoscopic images, as well as planar images, can be taken.

It is preferable that the camera device further comprises an optical axis control unit for changing an optical axis direction of the liquid lens, and the optical axis control unit changes the optical axis direction of the liquid lens in accordance with whether the liquid lens is switched to the single eye lens to take a planar image or the liquid lens is switched to the compound lens to take a stereoscopic image.

Owing to this, when the liquid lens is switched to a single eye lens to take a planar image and when the liquid lens is switched to a compound eye lens to take a stereoscopic image, an image taken by the liquid lens can be accurately formed at an appropriate position on the image pickup element.

It is preferable that the switching unit controls the amount of light transmitted through the liquid lens to irradiate an image pickup element when switching the liquid lens to the single eye lens to take a planar image and when switching the liquid lens to the compound eye lens to take a stereoscopic image.

owing to this, whether the ambient environment may be bright or dark, the light amount to be received can be controlled to be optimal to take an optimal still image or moving image.

It is preferable that the camera device further comprises a moving unit for changing a gap between an image pickup element and the liquid lens, and the moving unit controls the gap between the image pickup element and the liquid lens.

Owing to this, the gap between the liquid lens and the image pickup element can be optimized in correspondence with the focal distance of the liquid lens, and the zoom ratio including enlarging ratio and reducing ratio can be freely changed to take an optimal still image or moving image.

It is preferable that the camera device further comprises a recording unit, and the recording unit records either one of, or both of, a moving image and a still image taken by the liquid lens.

Owing to this, a still image or a moving image formed of a planar image or a stereoscopic image can be taken and also recorded and stored. It is also made possible to read the recorded and stored image later to be reproduced or used, and also to transfer such an image to another device to be reproduced or used.

It is preferable that the switching unit concentrically moves a liquid forming the liquid lens between an inner circumferential area and an outer circumferential area, to switch the liquid lens to the single eye lens or the compound eye lens.

Owing to this, the liquid forming the liquid lens can be moved efficiently with no waste and used to form a single eye lens or a compound eye lens.

It is preferable that the compound eye lens includes a plurality of microlenses; and the switching unit concentrically moves the liquid between the inner circumferential area and the outer circumferential area, to switch the number of the microlenses.

Owing to this, the liquid forming the liquid lens can be moved efficiently with no waste and used to form an arbitrary number of microlenses, and an image can be taken from an arbitrary number of points of view to generate various stereoscopic video images.

It is preferable that the liquid is moved by an electromagnetic control.

Owing to this, the liquid forming the liquid lens can be moved efficiently with no waste at low energy consumption with no need for a mechanical movable part and switchably used as a single eye lens or a compound eye lens.

It is preferable that the liquid is moved by a centrifugal force generated by rotating the liquid lens and an electromagnetic control.

owing to this, the liquid forming the liquid lens can be moved at high speed and efficiency and switchably used as a single eye lens or a compound eye lens.

It is preferable that the camera device further comprises an electro magnetic control unit for performing the electromagnetic control by turning on or off, or increasing or decreasing, at least one of a voltage and a magnetic field in a diameter direction continuously in repetition, and generating a wave motion in the liquid by the electromagnetic control, to move the liquid.

Owing to this, the liquid forming the liquid lens can be moved by, for example, an electromagnetic wave, at high speed and efficiency with no waste at low energy consumption with no need for a mechanical movable part and switchably used as a single eye lens or a compound eye lens.

It is preferable that the outer circumferential area of the liquid lens is not used for collecting light.

Owing to this, a part of the liquid forming the liquid lens which is not used for collecting light or forming an image is located in the outer circumferential area, such that the focal distance of the liquid lens or the number of the microlenses can be switched or set more freely and flexibly.

It is preferable that the switching unit moves the liquid forming the liquid lens between the inner circumferential area and the outer circumferential area so as to change a liquid amount distribution, thereby changing a light collection ratio of the liquid lens and thus controlling a sensitivity.

Owing to this, the light collection ratio or sensitivity of the liquid lens can be switched or set to be optimal in accordance with a bright/dark change of the ambient environment, a change of the range of the scene to be imaged, a change of the viewing angle or the like.

It is preferable that the switching unit decreases an amount of the liquid in the outer circumferential area, thereby decreasing the light collection ratio of the outer circumferential area of the liquid lens and thus decreasing the sensitivity.

Owing to this, the camera device can be optimally adapted to a significantly change of the light amount, for example, in the case of entry to, or exit from, a tunnel, and an optimal video image can be taken.

It is preferable that the switching unit thins the outer circumferential area of the liquid lens to decrease the amount of the liquid in the outer circumferential area.

Owing to this, the light collection ratio of the outer circumferential area of the liquid lens can be controlled to be decreased efficiently and at high speed.

It is preferable that the switching unit increases an amount of the liquid in the outer circumferential area, thereby increasing the light collection ratio of the outer circumferential area of the liquid lens and thus increasing the sensitivity.

Owing to this, even when taking a wide image, a clear video image can be taken even at ends or corners of the image area with no distortion.

It is preferable that the switching unit thickens the outer circumferential area of the liquid lens to increase the amount of the liquid in the outer circumferential area.

Owing to this, the light collection ratio of the outer circumferential area of the liquid lens can be controlled to be increased efficiently and at high speed.

It is preferable that the liquid amount distribution is changed by changing the voltage applied to the inner circumferential area and the outer circumferential area of the liquid lens to change a shape of the liquid lens.

Owing to this, the light collection ratio or sensitivity of the liquid lens can be switched or set more efficiently or at higher speed.

It is preferable that the switching unit moves a liquid in the liquid lens which is not used for collecting light to outside an area of the liquid lens which is used for collecting light.

Owing to this, the focal distance of the liquid lens or the number of the microlenses can be switched or set more freely and flexibly without being restricted by the amount of the liquid forming the liquid lens.

It is preferable that the switching unit, when switching the liquid lens to the compound eye lens, inscribes the liquid lens to an area of an image pickup element without overlapping.

Owing to this, the entire face of each lens can be effectively used although the aperture is small.

It is preferable that the camera device further comprises a video image input processing unit, the switching unit, when switching the liquid lens to the compound eye lens, inscribes the liquid lens to an area of an image pickup element with partial overlapping; and the video image input processing unit performs calculation processing on an input video image from the overlapped part to correct the video image of each lens.

Owing to this, the resolution can be set high with a large aperture.

It is preferable that the switching unit, when switching the liquid lens to the compound eye lens, circumscribes the liquid lens to an area of an image pickup element without overlapping.

Owing to this, the resolution can be set high with a large aperture.

It is preferable that the camera device further comprises a video image input processing unit, the switching unit, when switching the liquid lens to the compound eye lens, circumscribes the liquid lens to an area of an image pickup element with partial overlapping; and the video image input processing unit performs calculation processing on an input video image from the overlapped part to correct the video image of each lens.

Owing to this, the resolution can be set high with a large aperture.

It is preferable that an area outside the liquid lens is formed of a liquid, a gel-like substance or a gas each having a smaller specific gravity than that of the liquid lens.

Owing to this, a separation interface can be formed. It is preferable that the camera device further comprises a phase transition control unit for allowing the liquid lens to exist as a liquid only at the time of switching and causing the liquid lens to exist as a solid except for the time of switching. Owing to this, after the phase transition, the influence by the gravitational force can be fixed.

It is preferable that the camera device further comprises a phase transition control unit for allowing the liquid lens to exist as a gas only at the time of switching and causing the liquid lens to exist as a liquid or a solid except for the time of switching.

Owing to this, the lens arrangement can be performed at high speed.

It is preferable that the liquid lens is the single eye lens when the power is off.

Owing to this, the liquid lens can be maintained more power-saving.

It is preferable that the liquid lens is the compound eye lens when the power is off.

Owing to this, the liquid lens can be maintained more power-saving.

It is preferable that the liquid lens is shaped like a flat plate when the power is off.

Owing to this, the liquid lens can be maintained more power-saving.

It is preferable that the liquid lens is controllable to have a lens shape asymmetrical with respect to the center of each lens, as well as a lens shape symmetrical with respect to the center of each lens.

Owing to this, the liquid lens can properly correct the distortion caused by a change of the lens shape or properly react when being influenced by acceleration due to a gravitational force or the like.

It is preferable that when a part of an area of an image pickup element, the part including the switching unit, malfunctions and a part of an image formed by the compound eye lens is not usable, the switching unit locates the liquid lens only in an area of the image pickup element which is usable in order to take a planar image or a stereoscopic image.

Owing to this, even when a part of the image pickup element malfunctions, the video image can be taken without missing anything.

A second aspect of the present invention is directed to a liquid lens. The liquid lens according to the present invention comprises a liquid for refracting incident light, wherein the liquid lens is switched to a single eye lens or a compound eye lens by concentrically moving the liquid between an inner circumferential area and an outer circumferential area.

Owing to this, a compound eye structure can be realized to take a moving image or a still image without requiring a plurality of lenses to be mounted in advance. A switching operation to take a two-dimensional planar image or to take a three-dimensional stereoscopic image can be performed without a movable mechanism, and therefore the power consumption can be reduced and the reliability can be improved.

It is preferable that the compound eye lens includes a plurality of microlenses; and the number of the microlenses is switched by concentrically moving the liquid between the inner circumferential area and the outer circumferential area.

Owing to this, the liquid forming the liquid lens can be moved efficiently with no waste and used to form an arbitrary number of microlenses, and an image can be taken from an arbitrary number of points of view to generate various stereoscopic video images.

It is preferable that the liquid is moved by an electromagnetic control.

Owing to this, the liquid forming the liquid lens can be moved efficiently with no waste at low energy consumption with no need for a mechanical movable part and switchably used as a single eye lens or a compound eye lens.

It is preferable that the liquid is moved by a centrifugal force generated by rotating the liquid lens and an electromagnetic control.

Owing to this, the liquid forming the liquid lens can be moved at high speed and efficiently and switchably used as a single eye lens or a compound eye lens.

It is preferable that the electromagnetic control is performed by turning on or off, or increasing or decreasing, at least one of a voltage and a magnetic field in a diameter direction continuously in repetition, and a wave motion is generated in the liquid by the electromagnetic control, to move the liquid.

Owing to this, the liquid forming the liquid lens can be moved by, for example, an electromagnetic wave, at high speed and efficiently with no waste at low energy consumption with no need for a mechanical movable part and switchably used as a single eye lens or a compound eye lens.

A third aspect of the present invention is directed to an image pickup method using a liquid lens. By the method according to the present invention, the liquid lens is switched to a single eye lens or a compound eye lens; a planar image is taken in the state where the liquid lens is switched to the single eye lens; and a stereoscopic image is taken in the state where the liquid lens is switched to the compound eye lens.

Owing to this, a compound eye structure can be realized to take a moving image or a still image without requiring a plurality of lenses to be mounted in advance. A switching operation to take a two-dimensional planar image or to take a three-dimensional stereoscopic image can be performed without a movable mechanism, and therefore the power consumption can be reduced and the reliability can be improved.

Effect of the Invention

The present invention can provide a three-dimensional stereoscopic camera device which has a compound eye structure only by an electromagnetic control unit without requiring a plurality of lenses, a movable mechanism or the like to be mounted in advance. Owing to this, a switching operation to take a two-dimensional planar image or to take a three-dimensional stereoscopic image can be performed with no need for a movable mechanism. Therefore, the power consumption can be reduced and the reliability is improved. In addition, a compact and lightweight three-dimensional stereoscopic camera is provided.

For taking a two-dimensional planar image with a single eye lens or for taking a three-dimensional stereoscopic image with a compound eye lens, it is not necessary to mount a lens dedicated for the respective case. As compared with a system in which lenses for a compound eye lens are mounted in advance and only one lens is used for taking a two-dimensional planar image, the quality of a two-dimensional planar image, taken by using the liquid lens according to the present invention as a single eye lens, is not reduced.

BRIEF DESCRIPTION OF THE DRAWINGS

FIG. 14 is a schematic view showing a state in which the liquid lens unit is used as a lens for a single eye lens or lenses for a compound eye lens.

DESCRIPTION OF THE REFERENCE CHARACTERS

Figure 1:
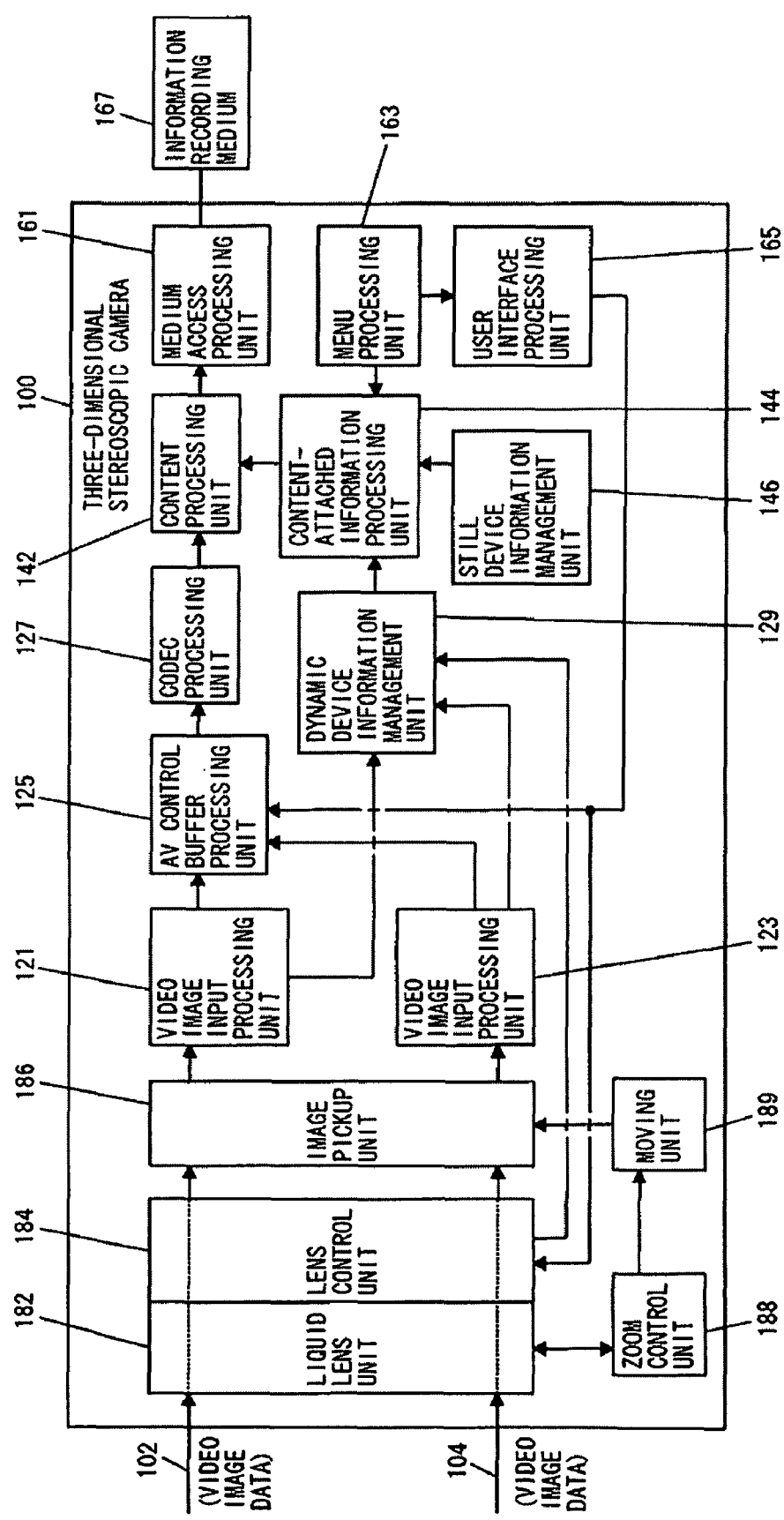
FIG. 1 is a block structural diagram of a main part of a three-dimensional stereoscopic camera according to an embodiment of the present invention.

100 Three-dimensional stereoscopic camera
102, 104 Video image data
121, 123 Video image input processing unit
125 AV control buffer processing unit
127 CODEC processing unit
129 Dynamic device information management unit
142 Content processing unit
144 Content-attached information processing unit
146 Still device information management unit
161 Medium access processing unit
163 Menu processing unit
165 User interface processing unit
167 Information recording medium
182 Liquid lens unit
184 Lens control unit
186 Image pickup element
188 Zoom control unit
189 Moving unit
301 Subject
351, 352, 353, 354, 355, 356, 960 Liquid microlens
371, 372, 373, 374, 375, 376 Image
472, 571, 572, 573, 962, 972 Droplet
474, 574, 674, 774, 814, 874, 974 Dielectric insulating layer
476, 976 Metal electrode
661 Lens for single eye lens
662, 752, 762, 811, 812, 821, 822, 852, 862 Lens for compound eye lens
669, 759, 769, 819, 829, 859, 869 Non-used liquid
910 3D camera
912 Moving button
913 Dial
915 Fixed head
916, 916' Movable head
917 Fixed head lens
918 Movable head lens
924 Zoom control unit
925 Position encoder
926, 929 Zoom motor
930 Display unit element determination unit
931 Subject depth determination unit
932 Vision feedback unit
933 Display unit
934 Image processing unit
935 Memory
937, 938 Optical axis
964 Transparent substrate
966 Light
968 Focal point

BEST MODE FOR CARRYING OUT THE INVENTION

Embodiments for carrying out the present invention will be described with reference to the drawings.

First Embodiment

FIG. 1 is a block structural diagram of a main part of a three-dimensional stereoscopic camera 100 according to an embodiment of the present invention. The three-dimensional stereoscopic camera 100 is usable as, for example, a video movie camera, a digital camera (digital still camera), a still image camera or a moving image camera used for industrial uses, consumer uses, monitors, robots, medicaluses, analytical uses, measurement uses, entertainment uses, and various other purposes.

The three-dimensional stereoscopic camera 100 includes one liquid lens unit 182 as a lens unit. As described later, the liquid lens unit 182 can reversibly change the focal distance thereof using an electronic wettability phenomenon described above, and also can be switched to be used as a single eye lens or a compound eye lens.

Figure 2:
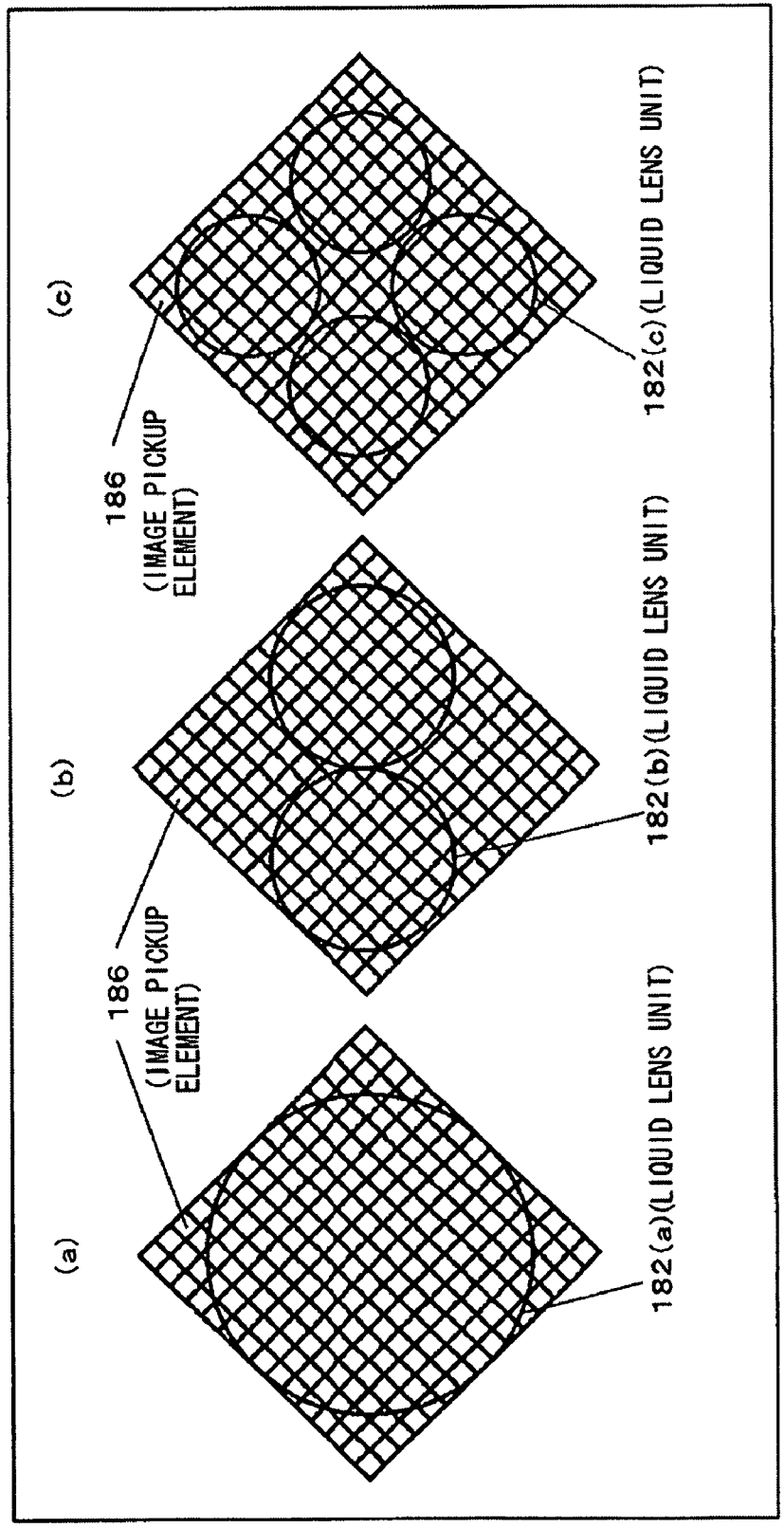
FIG. 2 is a schematic view showing states where a liquid lens unit is used as a lens for a single eye lens and lenses for a compound eye lens.

FIG. 2 schematically shows states where the liquid lens unit 182 is used as a single eye lens and a compound eye lens using the electronic wettability phenomenon.

FIG. 2(a) shows the state where the liquid lens unit 182 is used as a large single eye lens using the electronic wettability phenomenon. In an image pickup element 186, phototransistors, photodiodes or various other opto-electric elements of any of various materials and structures are arranged in any of various configurations, for example, a lattice matrix configuration, a houndstooth check configuration, a honeycomb configuration or the like in a two-dimensional planar shape. The image pickup element 186 is capable of taking a planar image. The image pickup element 186 is, for example, one CCD area image sensor chip, a CMOS-plane image sensor or the like. In FIG. 2(a) through FIG. 2(c), the large diamond-shaped element represents the image pickup element 186, and many small diamond-shaped elements arranged in the large diamond represent phototransistors or photodiodes. The size and the number of these elements are chosen for the convenience of drawing, and the present invention is not limited to the size and the number shown here.

FIG. 1, FIG. 2(a), FIG. 2(b) and FIG. 2(c) show the identical image pickup element 186. Between each of the liquid lens units 182(a), 182(b) and 182(c) shown in FIG. 2 and the image pickup element 186, a lens control unit 184 corresponding to the dielectric insulating layer 974 and the metal electrode 976 described above in the Background Art section is present. This will be described later in detail.

As described above and as shown in FIG. 2(a), FIG. 2(b) and FIG. 2(c), the liquid lens unit 182 uses the electronic wettability phenomenon to be switchable to be used as a single eye lens formed of one large lens (FIG. 2(a)), as a compound eye lens formed of two lenses (FIG. 2(b)), or as a compound eye lens formed of four lenses (FIG. 2(c)) by a control performed by the lens control section 184. Switching control methods will also be described later in detail.

The structure and arrangement of the lenses shown in FIG. 2(a), FIG. 2(b) and FIG. 2(c) are merely examples, and the liquid lens unit 182 may be used as a compound eye lens formed of three lenses, or as a compound eye lens formed of five or more lenses. In the case where the liquid lens unit 182 is used as a compound eye lens formed of two lenses, the lenses do not need to be arranged in a horizontal direction as shown in FIG. 2(*b*), and may be arranged in a vertical direction or in an oblique direction. This is also applicable to the case where the liquid lens unit 182 is used as a compound eye lens formed of three, four, or five or more lenses.

By switching the liquid lens unit 182 in this manner, one or a plurality of images of a subject can be formed on the image pickup element 186.

As understood from the shape of each of the liquid lens units 182(*a*), 182(*b*) and 182(*c*) respectively shown in FIG. 2(*a*), FIG. 2(*b*) and FIG. 2(*c*) as examples, the aperture of one or plurality of liquid microlenses forming the respective liquid lens unit 182 is different. In addition, the amount of light collected on the image pickup element 186 by the respective microlenses is different. Therefore, when the liquid lens unit 182 is switched to a single eye lens to take a planar image or to a compound eye lens to take a stereoscopic image, the amount of light transmitted through the liquid lens to irradiate the image pickup element 186 can be controlled.

Even when the liquid lens unit 182(*a*) is used as one lens as shown in FIG. 2(*a*), the lens aperture is freely changeable by an electromagnetic control described later in detail. Even when the liquid lens unit 182(*b*) is used as two lenses as shown in FIG. 2(*b*), the lens aperture is freely changeable by the electromagnetic control described later in detail. Even when the liquid lens unit 182(*c*) is used as four lenses as shown in FIG. 2(*c*), the lens aperture is freely changeable by the electromagnetic control described later in detail. In each case, the amount of light irradiating the image pickup element 186 is freely changeable.

Also as described later in detail, the focal distance of the liquid microlens can be changed, or can be kept the same, in accordance with whether the liquid lens unit 182 is used as the liquid lens unit 182(*a*) formed of one lens, the liquid lens 182 is used as the liquid lens unit 182(*b*) formed of two liquid microlenses, or the liquid lens 182 is used as the liquid lens unit 182(*c*) formed of four liquid microlenses. In the case where the focal distance is changed, the image to be taken can be zoom-controlled.

In this case, the gap between the liquid lens unit 182 and the image pickup element 186 needs to be controllably changed in association with the change of the focal distance of the liquid microlens. Such a change of the gap is performed by a moving unit 189 under the control performed by a zoom control unit 188 associated with the lens control unit 184. Specific moving means of the moving unit 189 can be implemented by a motor, a cam or the like.

In the case where, for example, the focal distance of the liquid microlens is not changed, the gap between the liquid lens unit 182 and the image pickup element 186 may be fixed.

Figure 3:
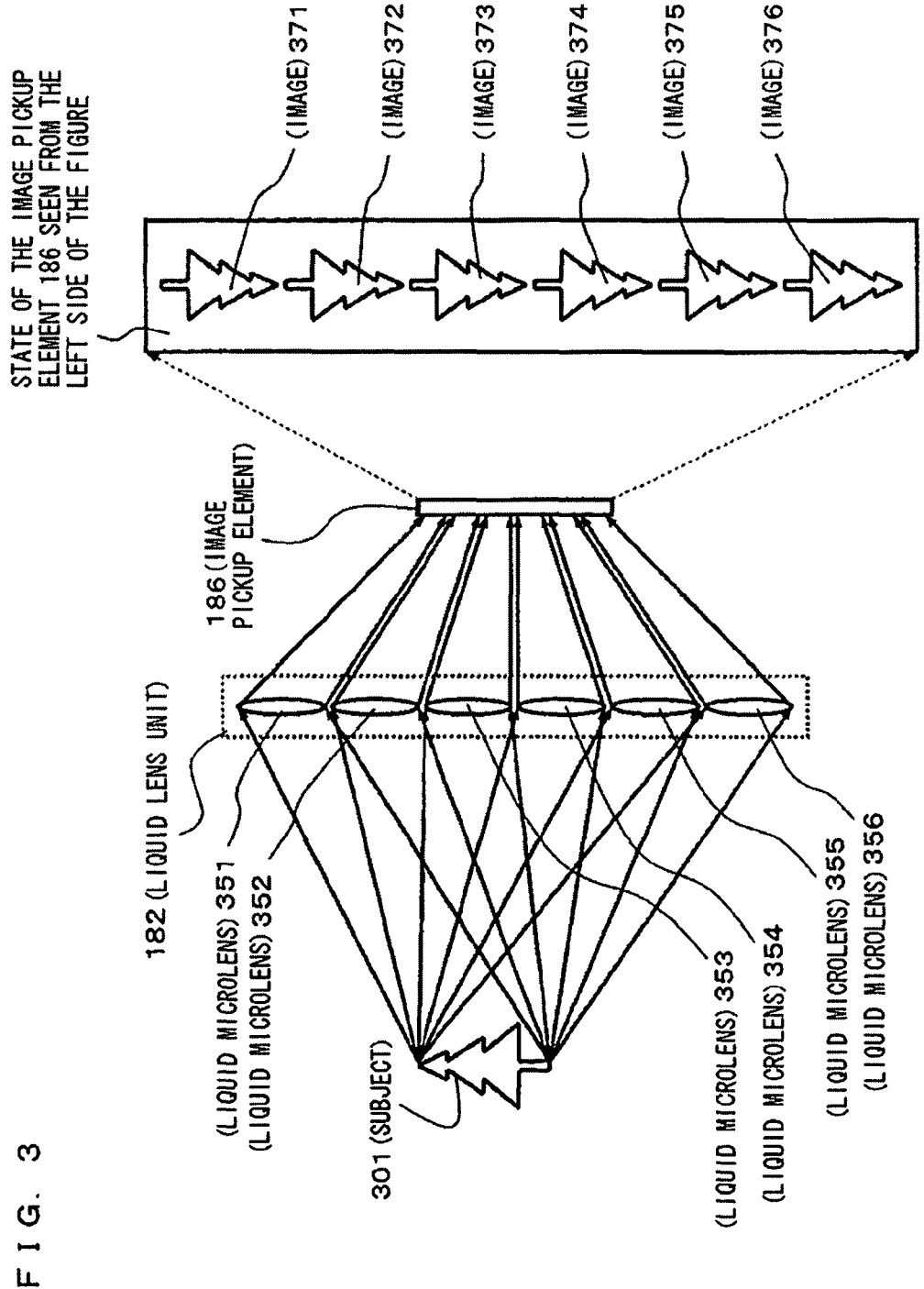
FIG. 3 shows an example of an image formed on an image pickup element by the liquid lens unit.

FIG. 3 shows an example of an image formed on the image pickup element 186 by the liquid lens unit 182.

In the example of FIG. 3, one liquid lens unit 182 is used as six liquid microlenses (liquid microlenses 351 through 356) by the control performed by the lens control unit (not shown in FIG. 3). Thus, six images (images 371 through 376) of a subject 301 can be formed on the image pickup element 186. In FIG. 3, the liquid lens 182 is used as six liquid microlenses arranged in a vertical line. This is chosen as an example for convenience of drawing, and the present invention is not limited to this as also described above. In FIG. 3, the images are formed only by the liquid microlenses 351 through 356 using one liquid lens unit 182. In actuality, a larger number of liquid lenses (not shown in FIG. 3) or fixed focus lenses (including a convex lens, concave lens, spherical lens, or aspheric lens) (not shown in FIG. 3) may be occasionally used.

As described later in detail, a moving image as well as a still image can be generated by processing the images 371 through 376. A three-dimensional stereoscopic image, a three-dimensional stereoscopic video image, a three-dimensional stereoscopic moving image or the like can be generated. In order to generate a three-dimensional stereoscopic image, a three-dimensional stereoscopic video image, a three-dimensional stereoscopic moving image or the like, two images having different points of view are sufficient. However, by using images taken from a larger number of different points of view, a wider variety of three-dimensional stereoscopic images, three-dimensional stereoscopic video images, three-dimensional stereoscopic moving images or the like can be generated.

For example, it is assumed that, as shown in FIG. 2(*b*), the liquid lens unit 182(*b*) in which the lens is divided into two lenses is used. In this case, two images of the subject are formed on the image pickup element 186. These two images are respectively input to video image input processing units 121 and 123. As described above, the liquid lens unit 182 may be used as being divided into a larger number of lenses. In such a case, a larger number of video image input processing units may be provided.

However, it is not indispensable to provide the same number of video image input processing units as the number of the lenses. A smaller number of video image input processing units may be shared, or the video image input processing units may be used in a time division manner, to process a plurality of pieces of video image input information.

In the example in this embodiment, video image data 102 is input to the video image input processing unit 121, and video image data 104 is input to the video image input processing unit 123. The video image data 102 and the video image data 104 are images (still images or moving images) of the same subject taken from different points of view, namely, from the positions of two lenses obtained by dividing one liquid lens unit 182 into two. It is not necessary that the video image data 102 and the video image data 104 are images of exactly the same subject, and may be images of subjects which are the same partially. The "subjects which are the same partially" means that the scenes taken as images (areas taken as images) by the lenses partially overlap.

The video image data 102 and the video image data 104 processed by the video image input processing units 121 and 123 are sent to an AV control buffer processing unit 125 and once accumulated therein. Based on user operation information which is sent from a user interface processing unit 165, various processing is executed on the video image data 102 and the video image data 104. For example, an exemplary operation performed by the user using the user interface processing unit 165 is designation of a CODEC system such as MPEG2, H.264 or the like. When the user designates a CODEC system, information representing the designated CODEC system is sent from the user interface processing unit 165 to the AV control buffer processing unit 125. The AV control buffer processing unit 125 instructs a CODEC processing unit 127 to perform CODEC based on the information.

Alternatively, it may be assumed, for example, that the operation performed by the user using the user interface processing unit 165 is three-dimensional recording of a video image. In this case, the video image data 102 and video image data 104, which are sent to the AV control buffer processing unit 125 and once accumulated therein, are sent to the CODEC processing unit 127 and are subjected to predetermined coding processing required for three-dimensional recording of the video image. The predetermined coding processing executed on this stage is as follows. When, for example, the data is moving image data, the predetermined coding processing is moving image compression coding executed by MPEG2, H.264 or the like. When, for example, the data is still image data, the predetermined coding processing is still image compression coding executed by JPEG, PNG, GIF, BMP or the like.

The switching of the liquid lens unit 182 in the three-dimensional stereoscopic camera 100 to a single eye lens or a compound eye lens to take a two-dimensional planar image, a three-dimensional stereoscopic image or a three-dimensional stereoscopic moving image; the switching of the focal distance to take a zoom image; and the designation for such switching are performed using the user interface processing unit 165. The information input by the user from the user interface unit 165 in accordance with a menu screen designated by a menu processing unit 163 is sent to the lens processing unit 184 or the AV control buffer processing unit 125 and subjected to necessary processing of, for example, switching the liquid lens unit 182 to a single eye lens or a compound eye lens or switching the focal distance.

The video image data 102 and the video image data 104 treated with the predetermined coding processing by the CODEC processing unit 127 are sent to a content processing unit 142 to be subjected to streaming processing. The "streaming processing" is, for example, processing of making data a partial transport stream (hereinafter, referred to as the "partial TS") or the like. Herein, the "partial TS" may include coding-processed moving image data and still image data as well as data including various types of content-attached information used for generating or recovering audio data, various types of attribute data, management data, or various other three-dimensional stereoscopic images.

The video image data 102 and the video image data 104 which have become partial TS's pass through a medium access processing unit 161 and are recorded on an information recording medium 167. The information recording medium 167 is, for example, detachable card type recording means using a nonvolatile semiconductor memory such as an SD memory card, detachable recording means using a semiconductor memory with a cell backup, detachable optical recording means using DVD (digital versatile disc), detachable optical recording means using BD (Blu-ray disc), non-detachable (fixed) magnetic recording means using HDD (hard disc drive) or the like. The above-listed recording means are exemplary, and the information recording medium 167 may be any other recording means.

The medium access processing unit 161 may include a device driver for accessing various information recording means as described above and a file system processing unit or the like for constructing a file system on such various information recording means, controlling the file system and using the file system.

Meanwhile, from the video image input processing units 121 and 123, dynamic device information, which represents various states of the lens control unit 184 and the liquid lens unit 182 when the video image data 102 and the video image data 104 are input, is sent to a dynamic device information management unit 129. The dynamic device information indicates, for example, how the liquid lens unit 182 is divided when the video image data 102 and the video image data 104 are obtained by image pickup, the number of divided lenses, the central position of the divided lenses, the viewing angle direction, the focal distance or various other information. Such information may be represented by absolute coordinate axes, which are the latitude and longitude of the globe, or may be any relative value represented by any of various other local coordinate axes.

Information which represents the state of the lens control unit 184 is also sent to the dynamic device information management unit 129 as a part of the dynamic device information. Such information represents, for example, the state of the lens control unit 184 when the liquid lens unit 182 is switched to a single eye lens or a compound eye lens to take a two-dimensional planar image, a three-dimensional stereoscopic image or a three-dimensional stereoscopic moving image, or when the focal distance is switched to take a zoom image, Such dynamic device information is once stored in the dynamic device information management unit 129, and may be optionally determined to be necessary or not to be necessary. Information determined to be necessary is sent to the content-attached information processing unit 144. The content-attached information processing unit 144 executes, on the dynamic device information, processing which is necessary, for example, to record the dynamic device information on the information recording medium 167 as being included in a partial TS. The dynamic device information is not necessarily included in the partial TS, and may be recorded on the information recording medium 167 separately from the partial TS.

A still device information management unit 146 records and manages various still parameter information relating to taking one or a plurality of images in the three-dimensional stereoscopic camera 100. The still parameter information is, for example, the refractive index of the liquid forming the liquid lens unit 182, the number of pixels and the pixel pitch of the image pickup element 186, or any other various information. Such information is also sent to the content-attached information processing unit 144. The content-attached information processing unit 144 may optionally determine such still device information to be necessary or not to be necessary. The content-attached information processing unit 144 executes, on the information determined to be necessary, processing which is necessary to record the still device information on the information recording medium 167 as being included in a partial TS. Such still device information is not necessarily included in a partial TS, and may be recorded on the information recording medium 167 separately from a partial TS.

In an embodiment in which the dynamic device information and the still device information are recorded separately from a partial TS, such information may be recorded as follows. The partial TS, the dynamic device information and the still device information may be recorded on the information recording medium 167 as one file; or a part or parts of such information may be recorded on the information recording medium 167 as a separate file or files. The partial TS, the dynamic device information and the still device information may be recorded in one directory or different directories, or may be recorded on one information recording medium 167 or a plurality of information recording mediums 167. The still device information includes various types of still parameter information relating to taking the video image data 102 and the video image data 104, and is not changed during normal image pickup. Therefore, the still device information does not need to be recorded on the information recording medium 167 simultaneously with, or immediately before or immediately after a partial TS or the dynamic device information, and may be recorded on the information recording medium 167 before or after a series of operations for image pickup are performed.

Dynamic parameter information and still parameter information mentioned above are also information which associates a video stream included in a video image content with a point of view at which the video stream is taken.

The dynamic device information and the still device information processed by the content-attached information processing unit 144 are sent to the content processing unit 142. Then, the dynamic device information and the still device information may be sent to the medium access processing unit 161 as a part of a partial TS after being incorporated into the partial TS, or may be sent to the medium access processing unit 161 as a separate file without being incorporated into the partial TS. Then, the dynamic device information and the still device information are recorded on the information recording medium 167.

The menu processing unit 163 displays a menu or a guide for helping the user who is operating the three-dimensional stereoscopic camera 100 using the user interface processing unit 165, and executes processing accompanying such an operation. For example, when the liquid lens unit 182 is used as being divided into two lenses as shown in FIG. 2(b) and the two lenses are used to obtain the video image data 102 and the video image data 104, the direction of the lenses, i.e., the optical axis thereof needs to be controlled to perform focusing. This control is performed by the lens control unit 184.

Figure 4:
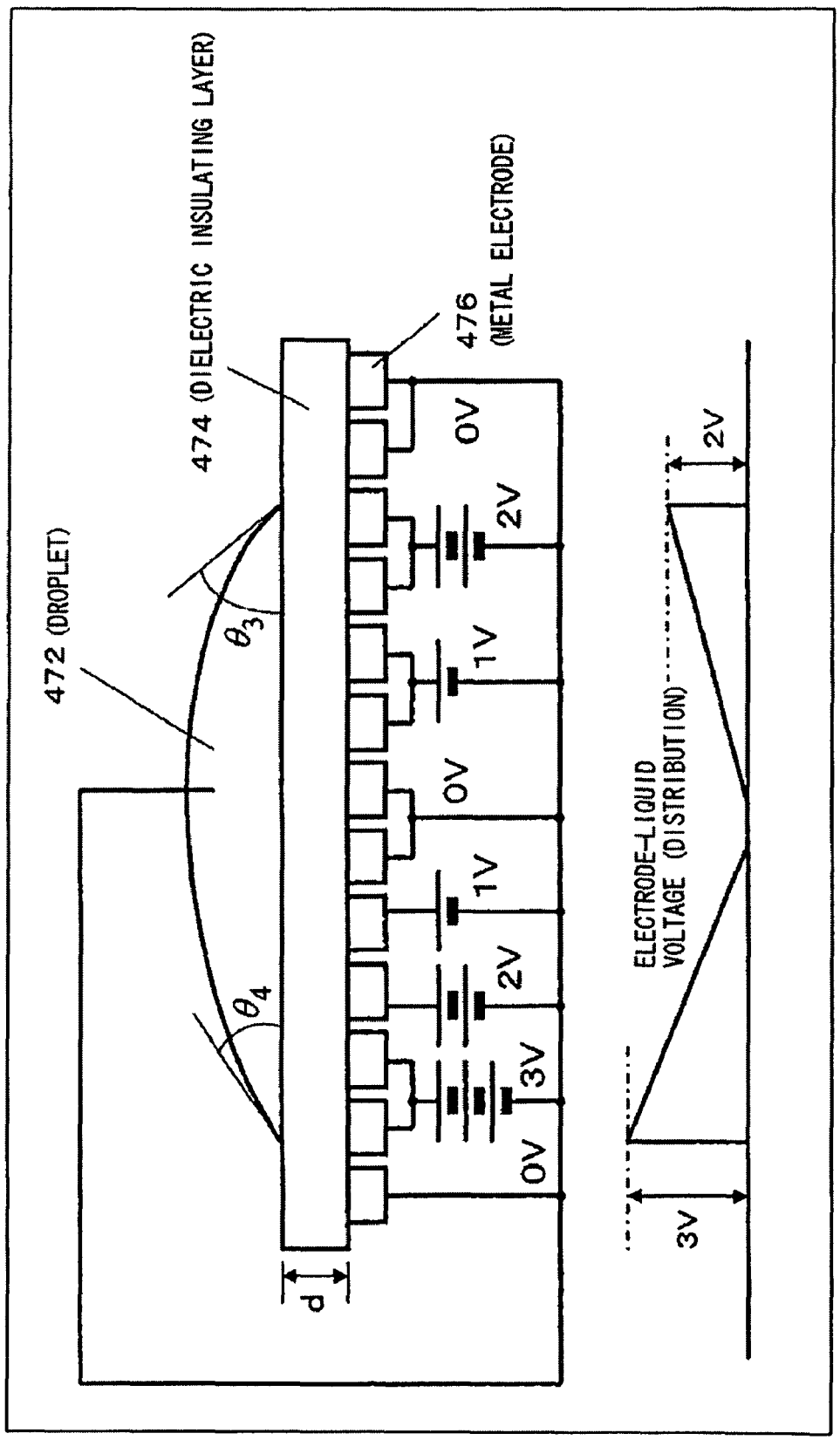
FIG. 4 is an enlarged view showing details of a lens control unit.

FIG. 4 is an enlarged view showing details of the lens control unit 184. As shown in FIG. 4, a metal electrode 476 forming the lens control unit 184 is divided into a plurality of small electrodes.

Figure 13:
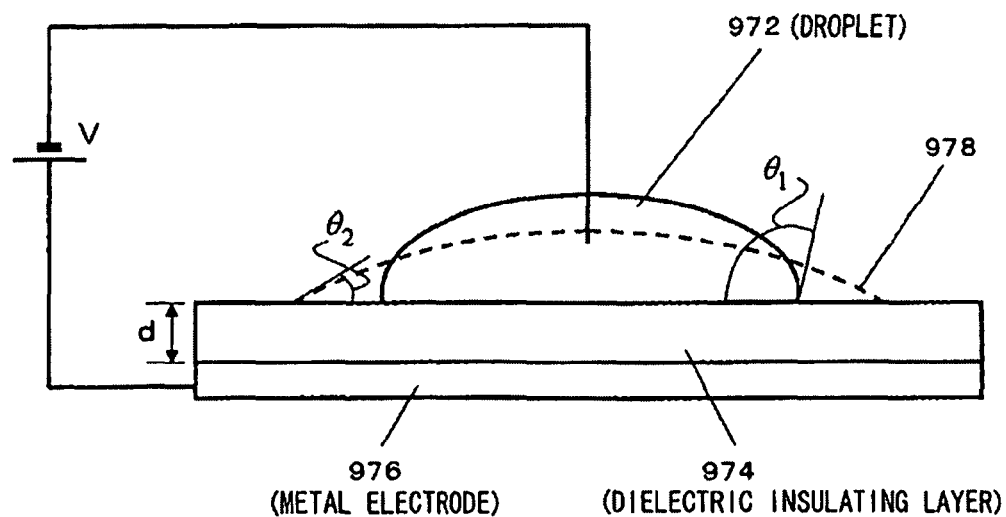
FIG. 13 is a schematic view showing an electron wettability phenomenon.

The conventional liquid micro lens shown in FIG. 13 which uses the electronic wettability phenomenon includes one metal electrode 976. By contrast, in the liquid lens unit 182 according to the present invention, the metal electrode 476 is divided into many small electrodes and different voltage values are applied to the small electrodes. Thus, the direction of the optical axis or the lens, the position of the focal point or the like can be controlled.

For example, it is assumed that, as shown in FIG. 4, 13 small metal electrodes 476 are located below the dielectric insulating layer 474, and the voltages shown in FIG. 4 are applied between these metal electrodes 476 and a droplet 472. Namely, no voltage (0 V) is applied to two rightmost metal electrodes 476, a voltage of 2 V is applied to two metal electrodes 476 to the left thereof, a voltage of 1 V is applied to two metal electrodes 476 to the left thereof, no voltage (0 V) is applied to two metal electrodes 476 to the left thereof, a voltage of 1 V is applied to one metal electrode 476 to the left thereof, a voltage of 2 V is applied to one metal electrode 476 to the left thereof, a voltage of 3 V is applied to two metal electrodes 476 to the left thereof, and no voltage (0 V) is applied to the leftmost metal electrode 476.

In FIG. 4, only 13 metal electrodes 476 are shown for the convenience of drawing, but in actuality a larger number of smaller metal electrodes 476 can be provided. The voltage values to be applied to the metal electrodes 476 do not need to be discrete values as represented by the voltage symbols in FIG. 4, and may be more continuous values or discrete values with a smaller pitch.

The distribution of such voltage values between the metal electrodes 476 and the droplet 472 is shown in a bottom part of FIG. 4 as "Electrode-liquid voltage (distribution)". As shown in FIG. 4, by applying a relatively low voltage on a right area of the droplet 472 and applying a relatively high voltage on a left area of the droplet 472, contact angle $\theta_3$ between the right end face of the droplet 472 and the dielectric insulating layer 474, and contact angle $\theta_4$ between the left end face of the droplet 472 and the dielectric insulating layer 474, can have the relationship of $\theta_3 > \theta_4$ as represented by expression 4.

Thus, the optical axis of the liquid lens unit 182 formed of the droplet 472 can be moved to be inclined from the vertical state shown in FIG. 4, and similarly the position of the focal point can be moved in the opposite direction from the optical axis.

Second Embodiment

Now, a method for switching the liquid lens unit 182 shown in FIG. 2 to the liquid lens 182(a), the liquid lens 182(b) or the liquid lens 182(c) shown in FIG. 2 by a control of the lens control unit 184 will be described.

The liquid lens unit 182 can be switched to a single eye lens or to a compound eye lens, or the number of lenses of the compound eye lens can be changed, by a control of moving a liquid forming the liquid lens unit 182 between an inner circumferential area and an outer circumferential area, a control of dividing the liquid forming the liquid lens unit 182 into an amount to be used as a lens and an amount not to be used as a lens, a control of moving the liquid not to be used as a lens to an area outer to the area to be used as a lens, or a control of distributing the liquid to be used as a lens in accordance with a predetermined lens shape or arrangement.

First, with reference to FIG. 5, a method for moving a droplet 571 on a dielectric insulating layer 574 from right to left in FIG. 5, sequentially from the droplet 571 to a droplet 572 to a droplet 573, will be described. By this method for moving the droplet, the control of dividing the liquid forming the liquid lens unit 182 into an amount to be used as a lens and an amount not to be used as a lens, or the control of moving the liquid not to be used as a lens to an area outer to the area to be used as a lens, can be executed.

Figure 5:
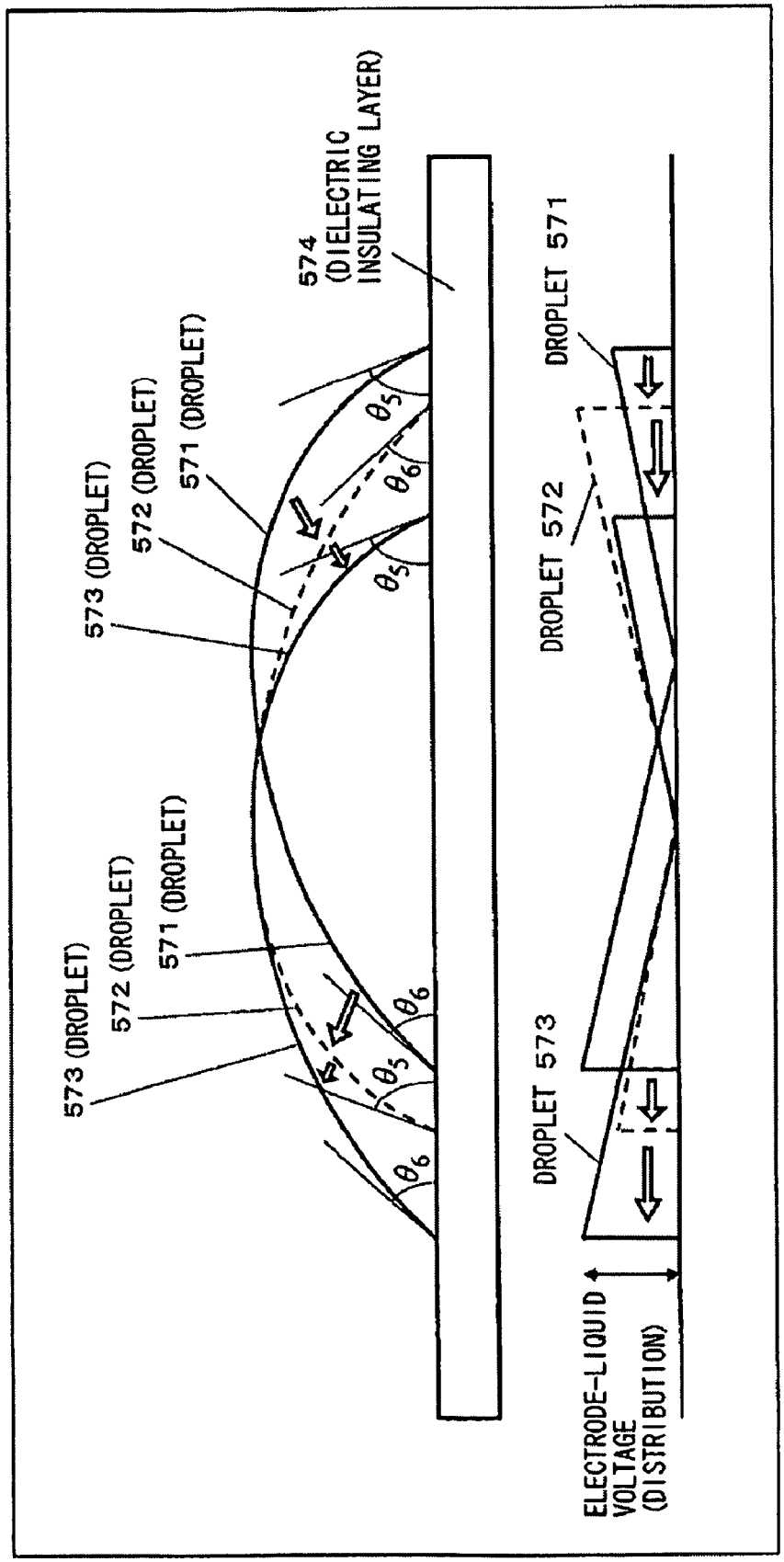
FIG. 5 shows an exemplary method for moving a droplet which forms the liquid lens unit.

Like the droplet 472 in FIG. 4, the droplet 571 shown in FIG. 5 is supplied with a relatively low voltage in a right area thereof and with a relatively high voltage in a left area thereof. As a result, contact angle $\theta_5$ between the right end face of the droplet 571 and the dielectric insulating layer 574 is larger than contact angle $\theta_6$ between the left end face of the droplet 571 and the dielectric insulating layer 574. Namely, $\theta_5 > \theta_6$. The distribution of the voltage values between the liquid above the dielectric insulating layer 574 and the electrode below the dielectric insulating layer 574 in this state is shown in the "Electrode-liquid voltage (distribution)" in a bottom part of FIG. 5 and represented with a solid line labeled "Droplet 571". Namely, in the case of the droplet 571, the voltage applied between the electrode and the liquid is highest at the left end, the voltage at the right end is lower than that of the left end, and the voltage applied to the central area is gradually reduced to 0 V from both ends.

In the next state, the range to which the voltage is applied is slightly shifted leftward, and a relatively high voltage is applied to the right area and a relatively low voltage is applied to the left area. The distribution of the voltage values between the liquid above the dielectric insulating layer 574 and the electrode below the dielectric insulating layer 574 in this state is shown in the "Electrode-liquid voltage (distribution)" in the bottom part of FIG. 5 and represented with a dashed line labeled "Droplet 572".

By changing the voltage distribution between the liquid above the dielectric insulating layer 574 and the electrode below the dielectric insulating layer 574 in this manner, the shape of the liquid above the dielectric insulating layer 574 is changed from the state of the droplet 571 to the state of the droplet 572 represented with the dashed line. Namely, the droplet 572 is slightly shifted leftward from the state of the droplet 571. In addition, the contact angle $\theta_6$ between the right end face of the droplet 571 and the dielectric insulating layer 574 is smaller than the contact angle $\theta_5$ between the left end face of the droplet 571 and the dielectric insulating layer 574. Namely, $\theta_5$, which is the contact angle at the right end face in the previous state, is the contact angle at the left end face in the current state; whereas $\theta_6$, which is the contact angle at the left end face in the previous state, is the contact angle at the right end face in the current state.

In the next state, the range to which the voltage is applied is further shifted leftward, and a relatively low voltage is applied to the right area and a relatively high voltage is applied to the left area. Namely, the distribution of the voltage values is like in the initial state except that the distribution has been shifted leftward. The distribution of the voltage values between the liquid above the dielectric insulating layer 574 and the electrode below the dielectric insulating layer 574 is shown in the "Electrode-liquid voltage (distribution)" in the bottom part of FIG. 5 and represented with a solid line labeled "Droplet 573".

By changing the voltage distribution between the liquid above the dielectric insulating layer 574 and the electrode below the dielectric insulating layer 574 in this manner, the shape of the liquid above the dielectric insulating layer 574 becomes as represented with a solid line labeled "Droplet 573". Namely, the droplet 573 is further shifted leftward from the state of the droplet 572. In addition, the contact angle $\theta_5$ between the right end face of the droplet 571 and the dielectric insulating layer 574 is larger than the contact angle $\theta_6$ between the left end face of the droplet 571 and the dielectric insulating layer 574. Namely, the shape of the droplet 573 is like the first droplet 571 except that the droplet has been shifted leftward.

By switching, at high speed, the range to which the voltage is applied between the liquid above the dielectric insulating layer 574 and the electrode below the dielectric insulating layer 574, and the strength of the voltage, i.e., the voltage distribution, the shape of the liquid above the dielectric insulating layer 574 can be changed and a wave motion can be generated. As a result, the liquid can be sequentially moved from the droplet 571 to the droplet 572 to the droplet 573, et seq.

By such an electromagnetic control, the liquid forming the liquid lens unit 182 above the dielectric insulating layer 574 can be concentrically moved, for example, from an inner circumferential area to an outer circumferential area, or from the outer circumferential area to the inner circumferential area. Alternatively, the liquid may be moved from the inner circumferential area to the outer circumferential area by a centrifugal force which is generated by rotating the liquid lens unit 182 itself instead of using the electromagnetic control, or by a combination of the centrifugal force and the electromagnetic control. Thus, the liquid forming the liquid lens unit 182 can be moved at higher speed or at higher efficiency.

In this manner, the control of dividing the liquid forming the liquid lens unit 182 into an amount to be used as a lens and an amount not to be used as a lens, or the control of moving the liquid not to be used as a lens to an area outer to the area to be used as a lens, can be executed.

Now, with reference to FIG. 6, a method for moving the liquid forming the liquid lens unit 182 while changing the distribution of the liquid, i.e., the shape of the droplet, to switch the liquid lens unit 182 to a lens 661 for a single eye lens or to lenses 662 for a compound eye lens will be described.

Figure 6:
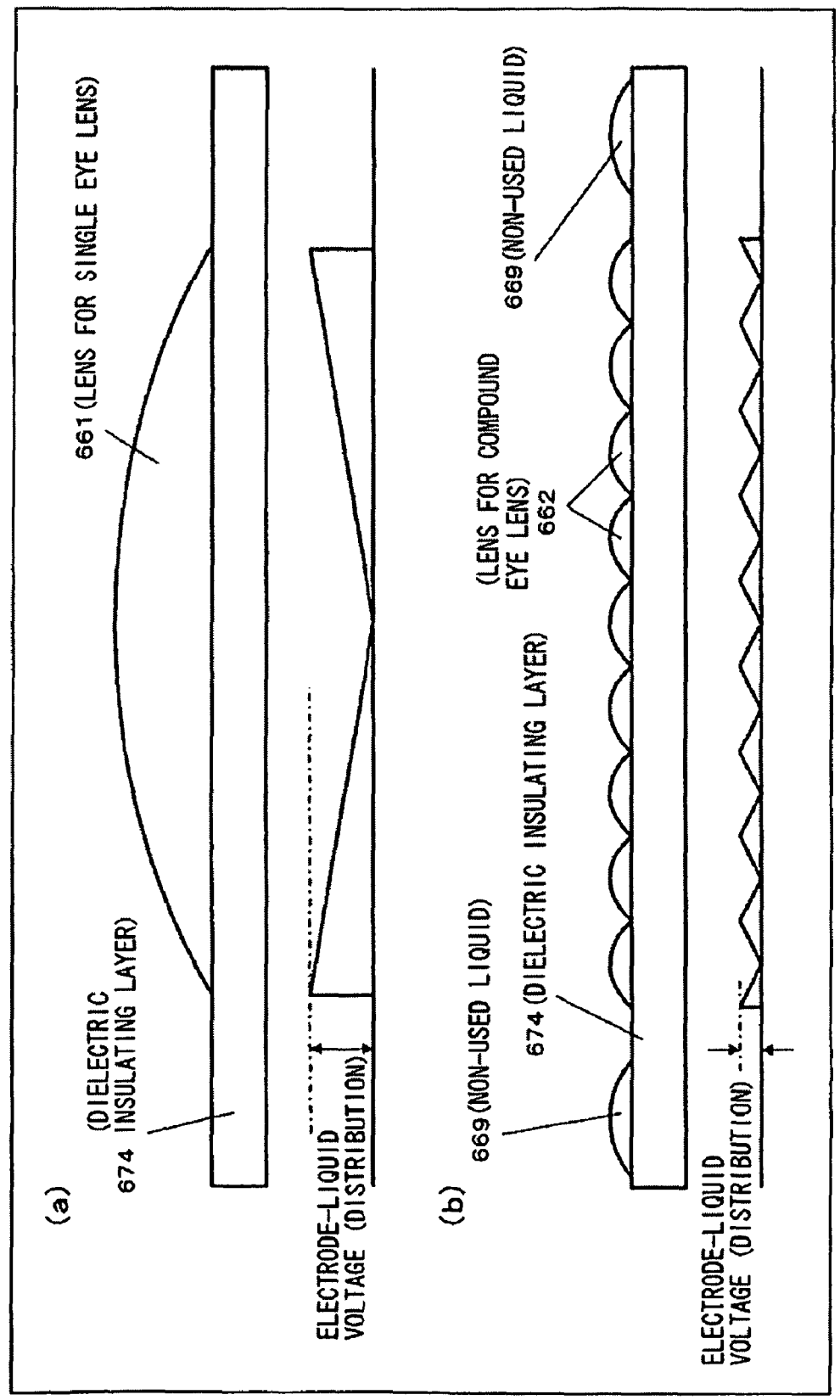
FIG. 6 shows an example of switching the liquid lens unit to a lens for a single eye lens or to lenses for a compound eye lens.

FIG. 6(*a*) shows a state where all the liquid forming the liquid lens unit 182 is used and one large lens 661 for the single eye lens is formed on a dielectric insulating layer 674. The lens 661 for the single eye lens corresponds to the liquid lens unit 182(*a*) shown in FIG. 2(*a*).

In this example, it is assumed that all the liquid forming the liquid lens unit 182 is used without leaving any part of the liquid non-used. Alternatively, there may be a non-used part of the liquid.

In the above-shown case, for example, the range to which the voltage is applied between the liquid above the dielectric insulating layer 674 and the electrode below the dielectric insulating layer 674, and the strength of the voltage, i.e., the voltage distribution are as shown in the "Electrode-liquid voltage (distribution)" in a bottom part of FIG. 6(*a*). Thus, one large liquid lens unit 182 having a large aperture, like the lens 661 for the single eye lens, can be formed. The lens 661 for the single eye lens is right-left symmetric, and therefore the voltage distribution is also right-left symmetric. By applying a high voltage to both ends thereof, the lens 661 for the single eye lens having a predetermined contact angle between the liquid and the dielectric insulating layer 674 can be formed, using the electronic wettability phenomenon. By changing the voltage, the focal distance or the like of the lens 661 for the single eye lens can be changed.

FIG. 6(*b*) shows a state where a liquid 669 which is not used for forming the liquid lens unit 182 is moved to an outer circumferential area of the dielectric insulating layer 674, and the remaining liquid is used to form many small lenses 662 for the compound eye lens on the dielectric insulating layer 674. The compound eye lens formed of the lenses 662 corresponds to a liquid lens unit which can be obtained by increasing the number of the plurality of microlenses of the liquid lens unit 182(*c*).

In this example, only nine lenses having a small aperture are shown as the lenses for the compound eye lens. The size and the number of these lenses having a small aperture are chosen for the convenience of drawing, and the present invention is not limited to such a size or number.

In the above-shown case, for example, the range to which the voltage is applied between the liquid above the dielectric insulating layer 674 and the electrode below the dielectric insulating layer 674, and the strength of the voltage, i.e., the voltage distribution are as shown in the "Electrode-liquid voltage (distribution)" in a bottom part of FIG. 6(*b*). Thus, a liquid lens unit 182 including many liquid microlenses having a small aperture, like the lenses 662 for the compound eye lens, can be formed.

Each of the microlenses 662 forming the compound eye lens is right-left symmetric, and therefore the voltage distribution is also right-left symmetric for each microlens. By applying a high voltage to both ends of each microlens, the compound eye lens including many microlenses 662, each having a predetermined contact angle between the liquid and the dielectric insulating layer 674, can be formed, using the electronic wettability phenomenon. By changing the voltage, the focal distance or the like of each microlens forming each lens 662 for the compound eye lens can be changed.

Figure 7:
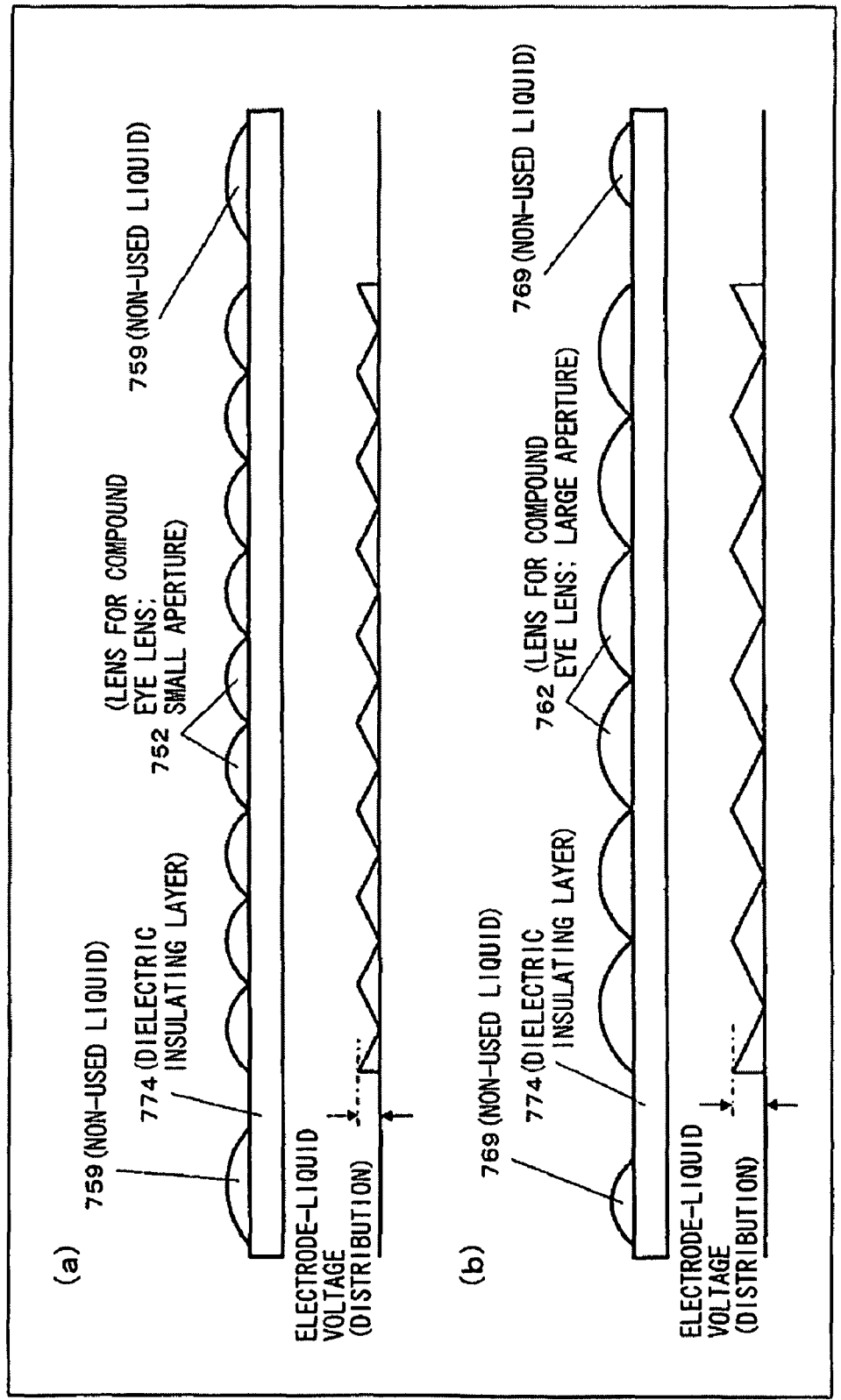
FIG. 7 shows an example of switching the aperture and the number of liquid microlenses forming the liquid lens unit.

Now, with reference to FIG. 7, a method for moving the liquid forming the liquid lens unit 182 while changing the distribution of the liquid, i.e., the shape of the droplet, to switch the aperture and the number of the liquid microlenses forming the liquid lens unit 182 will be described.

FIG. 7(a) shows a state where a relatively small amount of the liquid is used for forming the liquid lens unit 182 and many small lenses 752 (lenses having a small aperture) for a compound eye lens are formed on a dielectric insulating layer 774. In the example of FIG. 7(a), only nine lenses 752 having a small aperture for the compound eye lens are shown. The size and the number of these lenses are chosen for the convenience of drawing, and the present invention is not limited to such a size or number.

The liquid which is not used for forming the lenses 752 for the compound eye lens is moved to an outer circumferential area of the dielectric insulating layer 774 and pooled as a non-used liquid 759. In the example of FIG. 7(a), a relatively small amount of the liquid is used for forming the lenses 752 for the compound eye lens, and therefore the non-used liquid 759 has a relatively large amount. The method for moving the liquid is as described above, and will be omitted here.

In the above-shown case, for example, the range to which the voltage is applied between the liquid above the dielectric insulating layer 774 and the electrode below the dielectric insulating layer 774, and the strength of the voltage, i.e., the voltage distribution are as shown in the "Electrode-liquid voltage (distribution)" in a bottom part of FIG. 7(a). Thus, a liquid lens unit 182 including many liquid microlenses having a small aperture, like the lenses 752 for the compound eye lens, can be formed. The method for forming these many liquid microlenses is as described above, and will be omitted here.

FIG. 7(b) shows a state where a relatively large amount of the liquid is used for forming the liquid lens unit 182 and a relatively small number of relatively large lenses 762 (lenses having a large aperture) for a compound eye lens are formed on the dielectric insulating layer 774. In the example of FIG. 7(b), only six lenses 762 having a large aperture for the compound eye lens are shown. The size and the number of these lenses are chosen for the convenience of drawing, and the present invention is not limited to such a size or number.

The liquid which is not used for forming the lenses 762 for the compound eye lens is moved to an outer circumferential area of the dielectric insulating layer 774 and pooled as a non-used liquid 769. In the example of FIG. 7(b), a relatively large amount of the liquid is used for forming the lenses 762 for the compound eye lens, and therefore the non-used liquid 769 has a relatively small amount. The method for moving the liquid is also as described above, and will be omitted here.

In the above-shown case, for example, the range to which the voltage is applied between the liquid above the dielectric insulating layer 774 and the electrode below the dielectric insulating layer 774, and the strength of the voltage, i.e., the voltage distribution are as shown in the "Electrode-liquid voltage (distribution)" in a bottom part of FIG. 7(b). Thus, a liquid lens unit 182 including a relatively small number of liquid microlenses having a relatively large aperture, like the lenses 762 for the compound eye lens, can be formed. The method for forming such a relatively small number of liquid microlenses is also as described above, and will be omitted here.

The size (aperture) and the number of the liquid microlenses which can be formed are not limited to those shown in FIG. 7(a) or FIG. 7(b). By adjusting the amount of the liquid to be used and changing the range to which the voltage is applied between the liquid above the dielectric insulating layer 774 and the electrode below the dielectric insulating layer 774 and also the strength of the voltage, i.e., the voltage distribution, any size (aperture) of, and any number of, liquid microlenses with any focal distance can be formed on the dielectric insulating layer 774.

Third Embodiment

Figure 8:
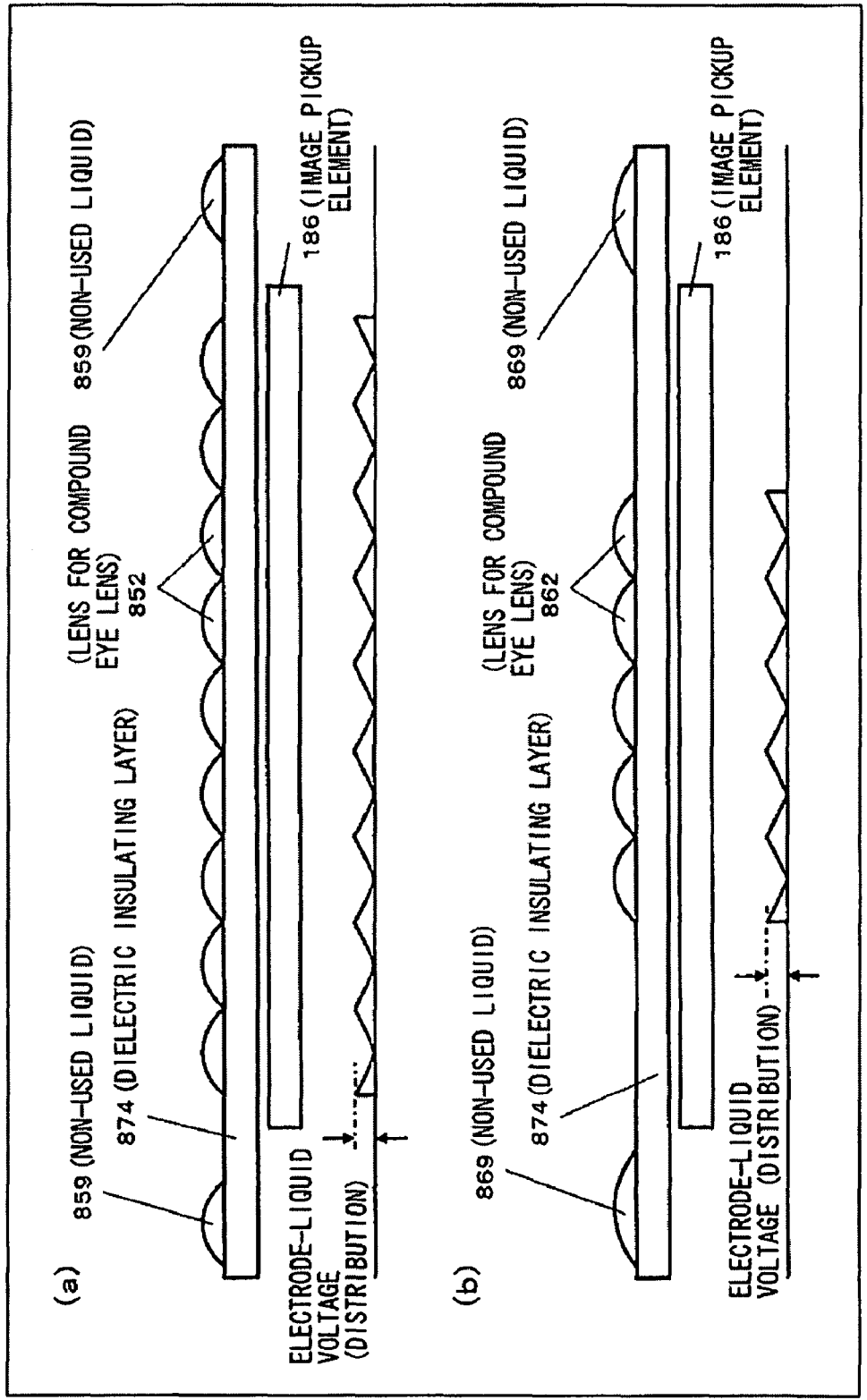
FIG. 8 shows an example of controlling the sensitivity by changing the light collection ratio of the liquid lens unit.

Now, with reference to FIG. 8, a method for moving the liquid forming the liquid lens unit 182 between an inner circumferential area and an outer circumferential area so as to change the liquid amount distribution while changing the light collection ratio of the liquid lens unit 182, to control the sensitivity will be described.

As described above, by an electromagnetic control of switching, at high speed, the range to which the voltage is applied between the liquid above a dielectric insulating layer 874 and the electrode below the dielectric insulating layer 874 and also the strength of the voltage, i.e., the voltage distribution, the shape of the liquid can be changed and a wave motion can be generated. As a result, the liquid forming the liquid lens unit 182 can be concentrically moved, for example, from an inner circumferential area to an outer circumferential area, or from the outer circumferential area to the inner circumferential area. Thus, the liquid amount distribution can be changed between the inner circumferential area and the outer circumferential area.

FIG. 8(a) shows a state where a relatively large amount of the liquid is collected to an inner circumferential area in this manner. A relatively large amount of the liquid is collected to the inner circumferential area, and therefore a non-used liquid 859 collected to the outer circumferential area has a relatively small amount.

The range to which the voltage is applied between the liquid above the dielectric insulating layer 874 and the electrode below the dielectric insulating layer 874, and the strength of the voltage, i.e., the voltage distribution are as shown in the "Electrode-liquid voltage (distribution)" in a bottom part of FIG. 8(a). Thus, a liquid lens unit 182 including a relatively large number of liquid microlenses, like lenses 852 for the compound eye lens, can be formed. The size and the number of these liquid microlenses are chosen as an example for the convenience of drawing, and the present invention is not limited to such a size or number. As shown in FIG. 8(a), the lenses 852 for the compound eye lens cover a relatively large area (almost the entire area) of the image pickup element 186, and therefore the sensitivity is relatively high in this state.

FIG. 8(b) shows a state where a relatively small amount of the liquid is collected to the inner circumferential area in the above-described manner. A relatively small amount of the liquid is collected to the inner circumferential area, and therefore the non-used liquid 859 collected to the outer circumferential area has a relatively large amount.

The range to which the voltage is applied between the liquid above the dielectric insulating layer 874 and the electrode below the dielectric insulating layer 874, and the strength of the voltage, i.e., the voltage distribution are as shown in the "Electrode-liquid voltage (distribution)" in a bottom part of FIG. 8(b). Thus, a liquid lens unit 182 including a relatively small number of liquid microlenses, like lenses 862 for the compound eye lens, can be formed. The size and the number of these microlenses are chosen as an example for the convenience of drawing, and the present invention is not limited to such a size or number.

As shown in FIG. 8(b), the lenses 862 for the compound eye lens cover only a relatively small area of the image pickup element 186, and therefore the sensitivity is relatively low in this state.

By such a control performed by the lens control unit 184, the liquid forming the liquid lens unit 182 is moved between an inner circumferential area and an outer circumferential area so as to change the liquid amount distribution while the light collection ratio of the liquid lens unit 182 is changed. As a result, the sensitivity can be controlled.

In this manner, whether the liquid lens unit 182 may be used as lenses for a compound eye lens or as a lens for a single eye lens, the range of the image pickup element 186 which includes such a lens or lenses can be controlled. Accordingly, whether the liquid lens unit 182 may be switched to a single eye lens to take a planar image or to a compound eye lens to take a stereoscopic image, the amount of light transmitted through the liquid lens unit 182 to irradiate the image pickup element 186 can be controlled.

Figure 9:
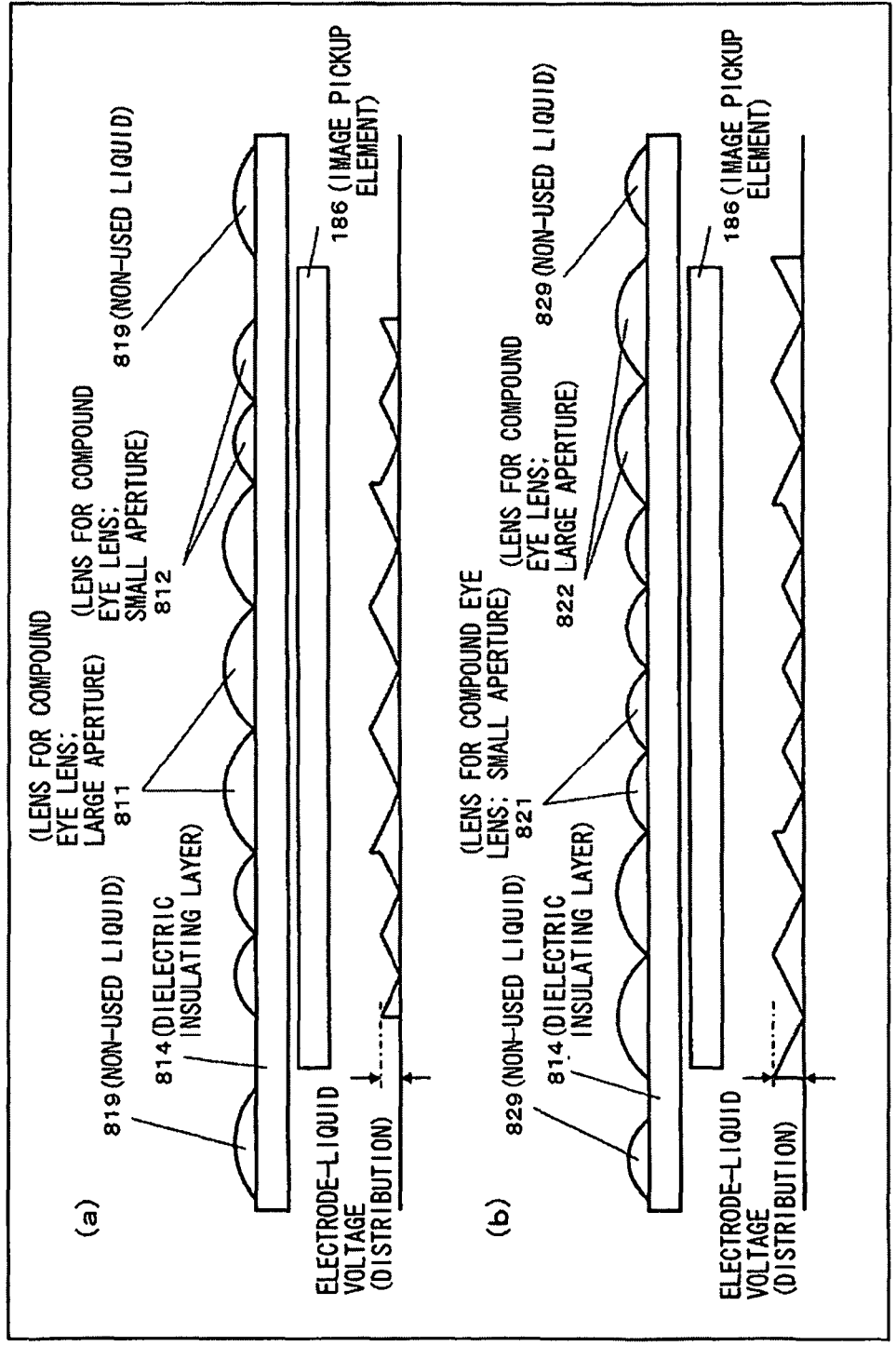
FIG. 9 shows an example of switching the sensitivity of an inner circumferential area and an outer circumferential area of the liquid lens unit.
Figure 10:
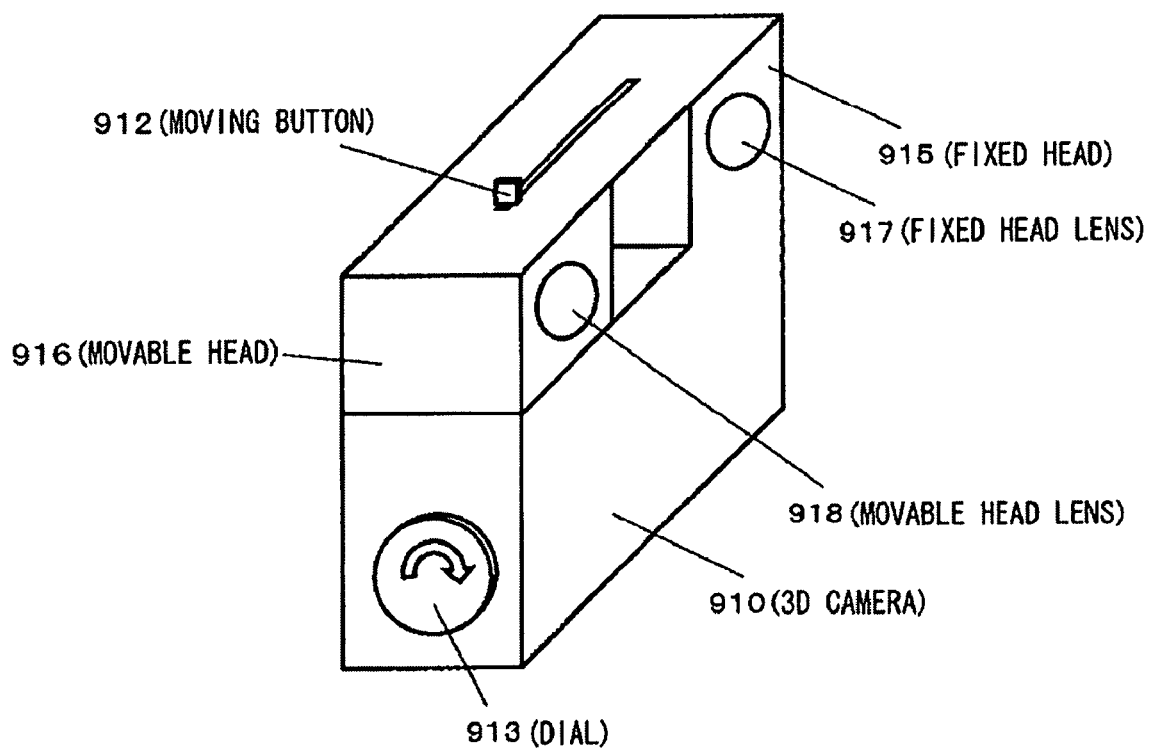
FIG. 10 is an external view of a conventional 3D camera.
Figure 11:
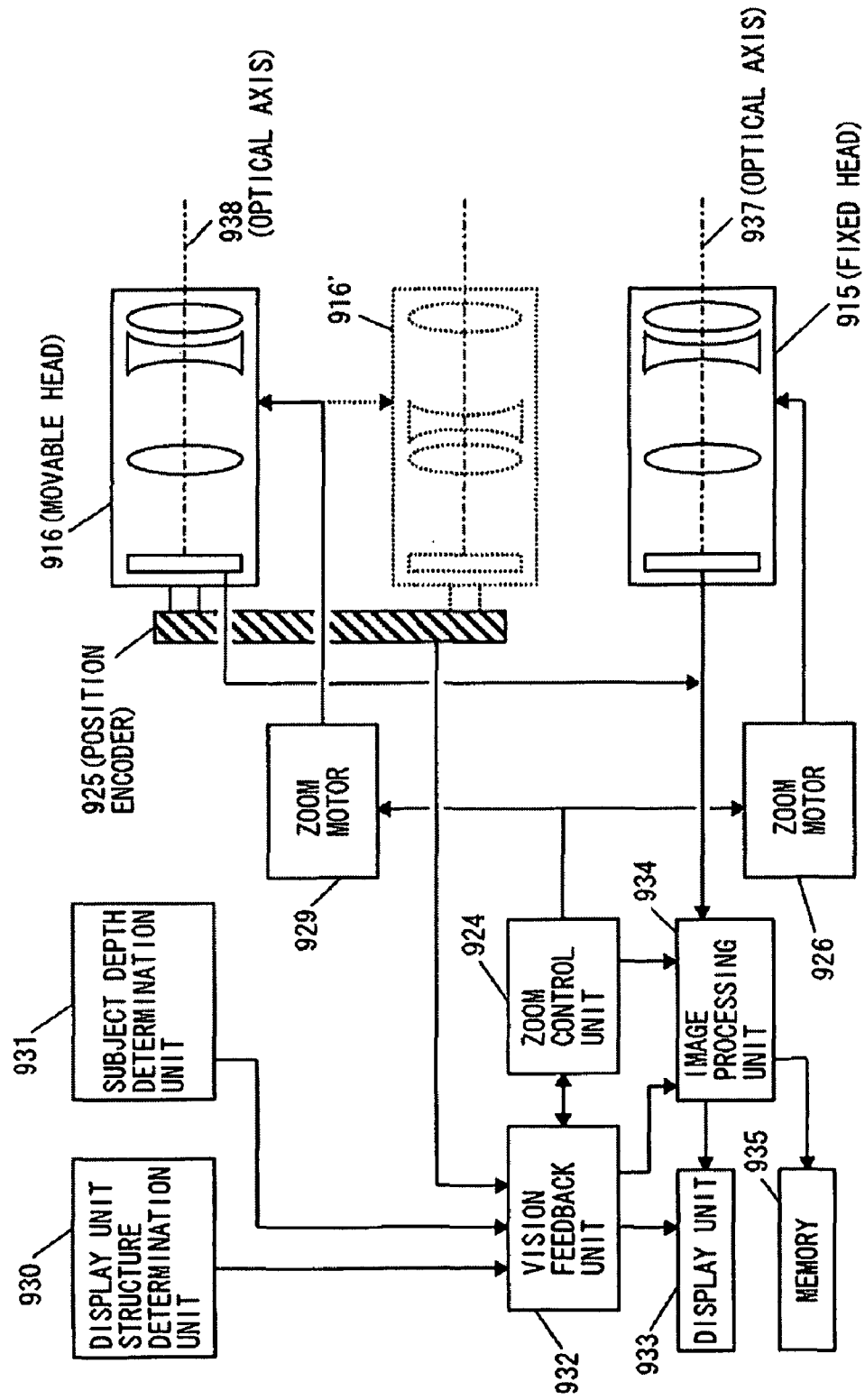
FIG. 11 is a block structural diagram of a main part of a conventional 3D camera.
Figure 12:
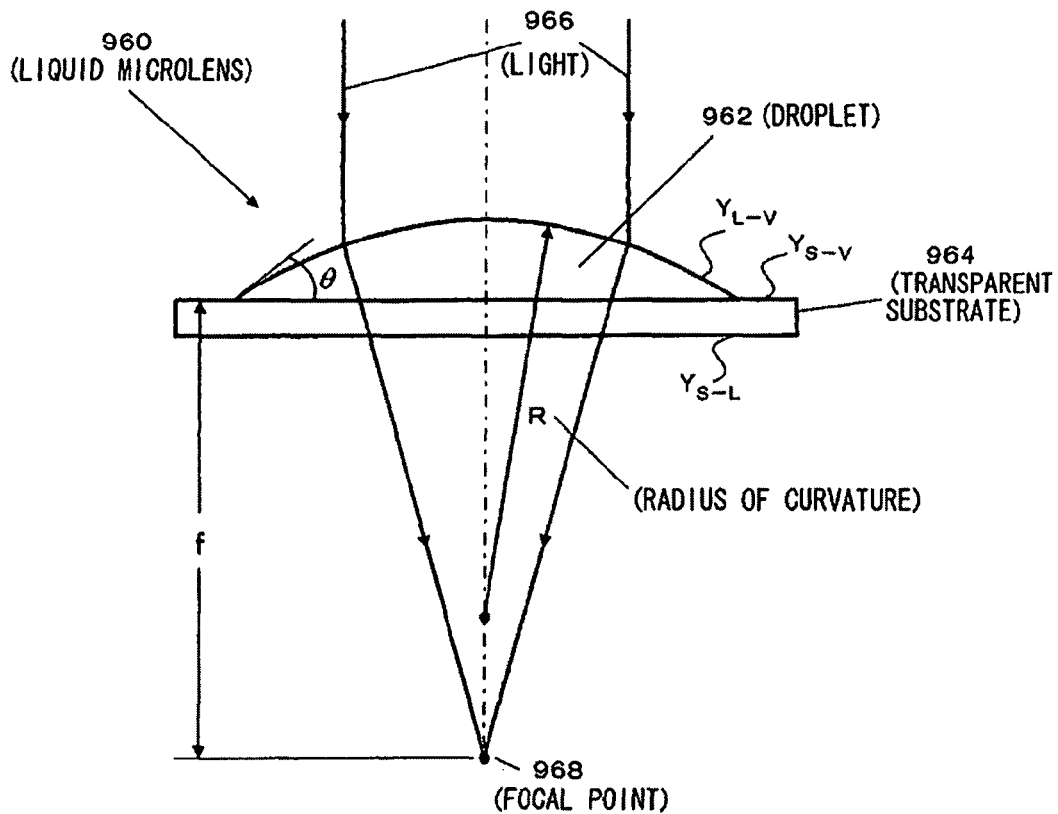
FIG. 12 is a cross-sectional view of a conventional liquid microlens.

Now, with reference to FIG. 9, a method for thickening an inner circumferential area of the liquid lens unit 182 to increase the liquid amount of the inner circumferential area, thereby increasing the light collection ratio of the inner circumferential area of the liquid lens unit 182 and thus raising the sensitivity of the inner circumferential area, and a method for thickening an outer circumferential area of the liquid lens unit 182 to increase the liquid amount of the outer circumferential area, thereby increasing the light collection ratio of the outer circumferential area of the liquid lens unit 182 and thus raising the sensitivity of the outer circumferential area, will be described.

The method for concentrically moving the liquid forming the liquid lens unit 182 from an inner circumferential area to an outer circumferential area, or from the outer circumferential area to the inner circumferential area, to change the liquid amount distribution between the inner circumferential area and the outer circumferential area is as described above. Namely, by an electromagnetic control of switching, at high speed, the range to which the voltage is applied between the liquid above a dielectric insulating layer 814 and the electrode below the dielectric insulating layer 814 and also the strength of the voltage, i.e., the voltage distribution, the shape of the liquid can be changed and a wave motion can be generated. As a result, the liquid forming the liquid lens unit 182 can be concentrically moved, for example, from an inner circumferential area to an outer circumferential area, or from the outer circumferential area to the inner circumferential area. Thus, the liquid amount distribution can be changed between the inner circumferential area and the outer circumferential area.

FIG. 9(a) shows a state where a relatively large amount of the liquid is collected as a non-used liquid 819 to an outer circumferential area in which the image pickup element 186 is not present, in the above-described manner.

A relatively large amount of the liquid is collected as the non-used liquid 819 to the outer circumferential area, and therefore the liquid collected to an area where the image pickup element 186 is present has a relatively small amount.

The range to which the voltage is applied between the liquid above the dielectric insulating layer 814 and the electrode below the dielectric insulating layer 814, and the strength of the voltage, i.e., the voltage distribution are as shown in the "Electrode-liquid voltage (distribution)" in a bottom part of FIG. 9(a). Thus, as shown in FIG. 9(a), lenses 811 for the compound lens which have a relatively large aperture can be formed in a central area of the liquid lens unit 182, and lenses 812 for the compound lens which have a relatively small aperture can be formed in an area, surrounding the central area but inner to the non-used liquid 819, where the image pickup element 186 is present. The size and the number of these liquid microlenses are chosen as an example for the convenience of drawing, and the present invention is not limited to such a size or number. The amount of the non-used liquid 819 and the amount of the liquid collected to the area where the image pickup element 186 is present are determined depending on the size or the number of the plurality of liquid microlenses, and are not limited to those shown in FIG. 9(a).

As shown in FIG. 9(a), the liquid lens unit 182 has a thicker central area and a thinner outer circumferential area. Thus, the liquid amount of the central area is increased whereas the liquid amount of the outer circumferential area is decreased. As a result, the light collection ratio of the central area can be increased to raise the sensitivity, whereas the light collection ratio of the outer circumferential area can be decreased to reduce the sensitivity.

The liquid lens unit 182 formed in this manner can take a clear video image even in the case where the light amount greatly changes, for example, in the case of entry to, or exit from, a tunnel.

FIG. 9(b) shows a state where a relatively small amount of the liquid is collected as a non-used liquid 829 to the outer circumferential area in which the image pickup element 186 is not present, in the above-described manner.

A relatively small amount of the liquid is collected as the non-used liquid 829 to the outer circumferential area, and therefore the liquid collected to the area where the image pickup element 186 is present has a relatively large amount.

The range to which the voltage is applied between the liquid above the dielectric insulating layer 814 and the electrode below the dielectric insulating layer 814, and the strength of the voltage, i.e., the voltage distribution are as shown in the "Electrode-liquid voltage (distribution)" in a bottom part of FIG. 9(b). Thus, as shown in FIG. 9(b), lenses 821 for the compound lens which have a relatively small aperture can be formed in the central area of the liquid lens unit 182, and lenses 822 for the compound lens which have a relatively large aperture can be formed in the area, surrounding the central area but inner to the non-used liquid 829, where the image pickup element 186 is present. The size and the number of these liquid microlenses are chosen as an example for the convenience of drawing, and the present invention is not limited to such a size or number. The amount of the non-used liquid 829 and the amount of the liquid collected to the area where the image pickup element 186 is present are determined depending on the size or the number of the plurality of liquid microlenses, and are not limited to those shown in FIG. 9(b).

Which of the amount of the non-used liquid 819/the amount of the non-used liquid 829 and the amount of the liquid collected to the area where the image pickup element 186 is present shown in FIG. 9(a)/FIG. 9(b) is larger, and how much larger, are also determined depending on the size or the number of the plurality of liquid microlenses, and are not limited to those in the above-described examples.

As shown in FIG. 9(b), the liquid lens unit 182 has a thinner central area and a thicker outer circumferential area. Thus, the liquid amount of the central area is decreased whereas the liquid amount of the outer circumferential area is increased. As a result, the light collection ratio of the central area can be decreased to reduce the sensitivity, whereas the light collection ratio of the outer circumferential area can be increased to raise the sensitivity.

Even when taking a wide image, the liquid lens unit 182 formed in this manner can take a video image which is not distorted even at ends or corners of the image pickup element 816.

Other Embodiments

In the above embodiments, the material forming the liquid lens unit 182 is described as being "liquid". The material is not necessarily limited to a liquid, and may be, for example, a gel-like material, a powder material, a solid material or any other material which can be moved by an electromagnetic control, by a combination of an electromagnetic control and a dynamic control, or the like.

Alternatively, a material which is put into a movable state only when being required to be moved by an electromagnetic control, by a combination of an electromagnetic control and a dynamic control, or the like may be used.

The material which forms the liquid lens unit 182 may be moved by a system of controlling the environment of the area including the liquid lens unit 182 to indirectly change the shape of the lens, instead of the electromagnetic control or by a combination of the electromagnetic control and the dynamic control.

Such a system of controlling the environment of the area including the liquid lens unit 182 to indirectly change the shape of the lens is, for example, a system of changing the atmospheric pressure or the wind pressure around the liquid lens unit 182, a system of filling the area around the liquid lens unit 182 with another liquid and changing the pressure distribution of the liquid which fills the area around the liquid lens unit 182, or the like.

Figure 15:
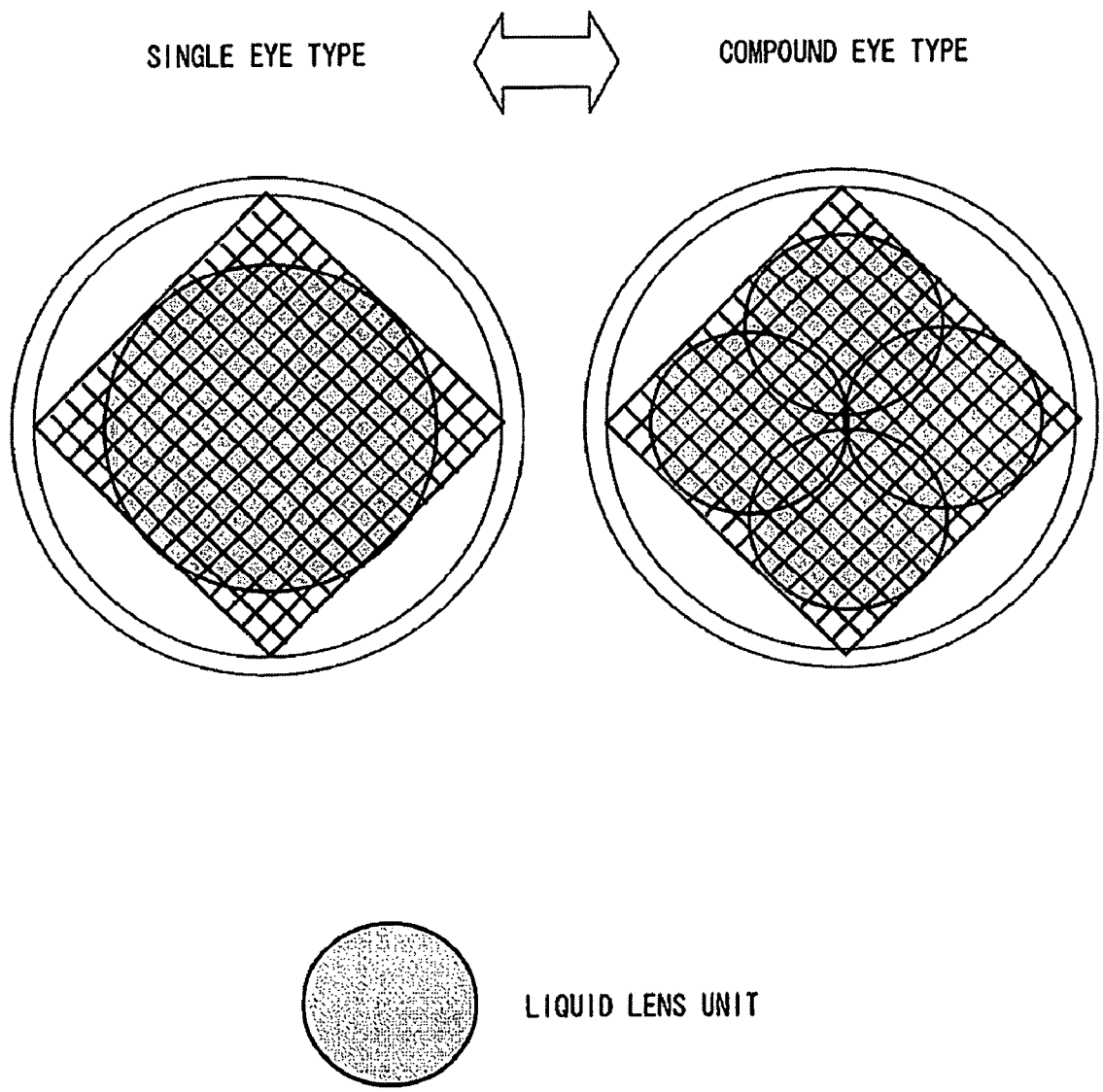
FIG. 15 is a schematic view showing a state in which the liquid lens unit is used as a lens for a single eye lens or lenses for a compound eye lens.

As shown in FIG. 14, the liquid lens, when being switched to a compound eye lens, may be inscribed in the area of the image pickup element without the liquid lenses included in the compound eye lens overlapping. Thus, although each of the lenses has a small aperture, the entire face of each lens can be effectively used. Alternatively, as shown in FIG. 15, the liquid lens, when being switched to a compound eye lens, may be inscribed in the area of the image pickup element while the lenses included in the compound eye lens partially overlap one another. The video image input processing units 121 and 123 may execute calculation processing on an input video image from such an overlapping area to correct the video image corresponding to each of the lenses. Thus, the resolution can be set high with a large aperture.

Figure 16:
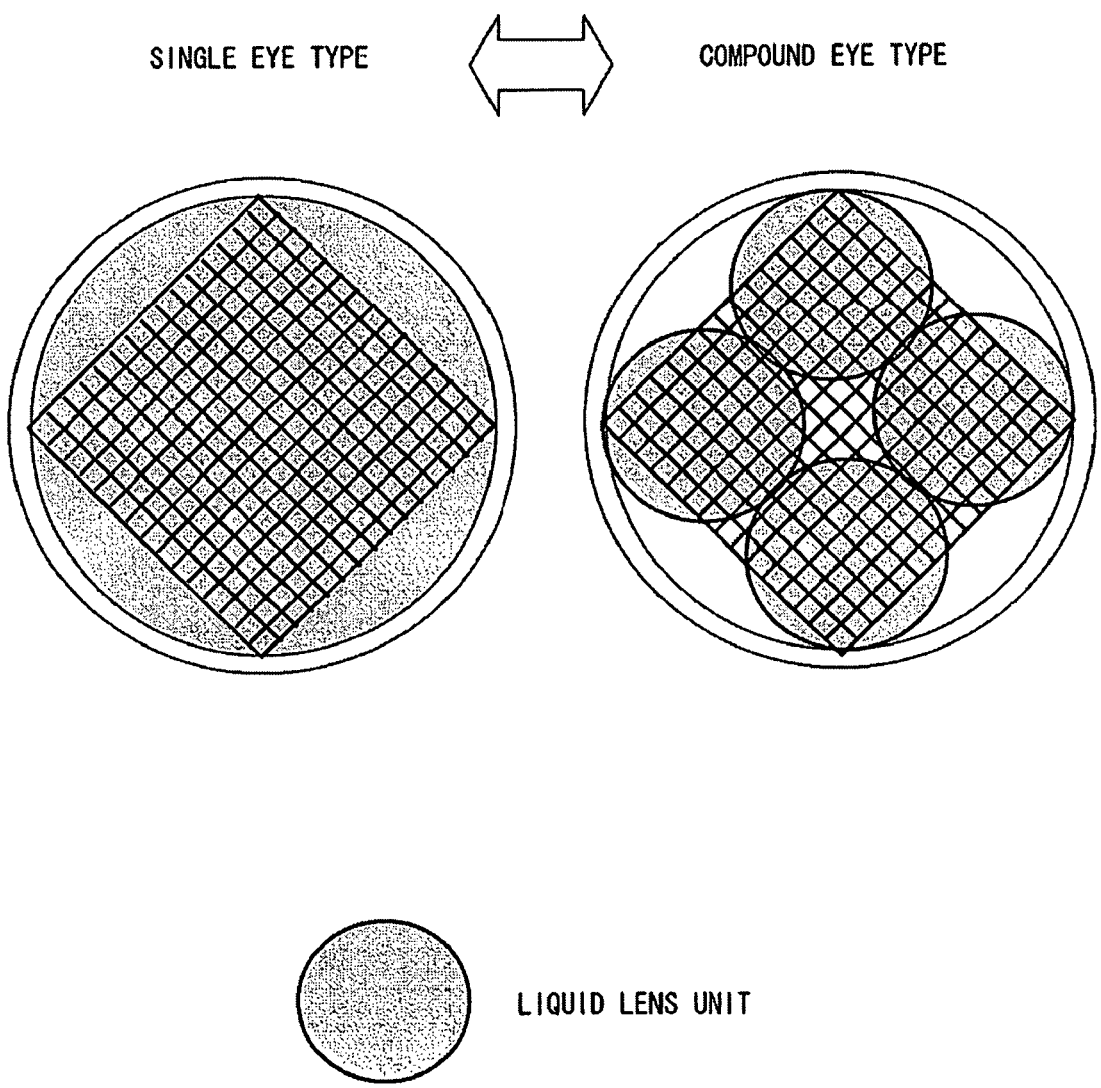
FIG. 16 is a schematic view showing a state in which the liquid lens unit is used as a lens for a single eye lens or lenses for a compound eye lens.

As shown in FIG. 16, the liquid lens, when being switched to a compound eye lens, may be circumscribed on the area of the image pickup element without the lenses included in the compound eye lens overlapping. Thus, the resolution can be set high with a large aperture. Still alternatively, the liquid lens, when being switched to a compound eye lens, may be circumscribed on the area of the image pickup element while the lenses included in the compound eye lens partially overlap one another. The video image input processing units 121 and 123 may execute calculation processing on an input video image from such an overlapping area to correct the video image corresponding to each of the lenses. Thus, the resolution can be set high with a large aperture.

Figure 17:
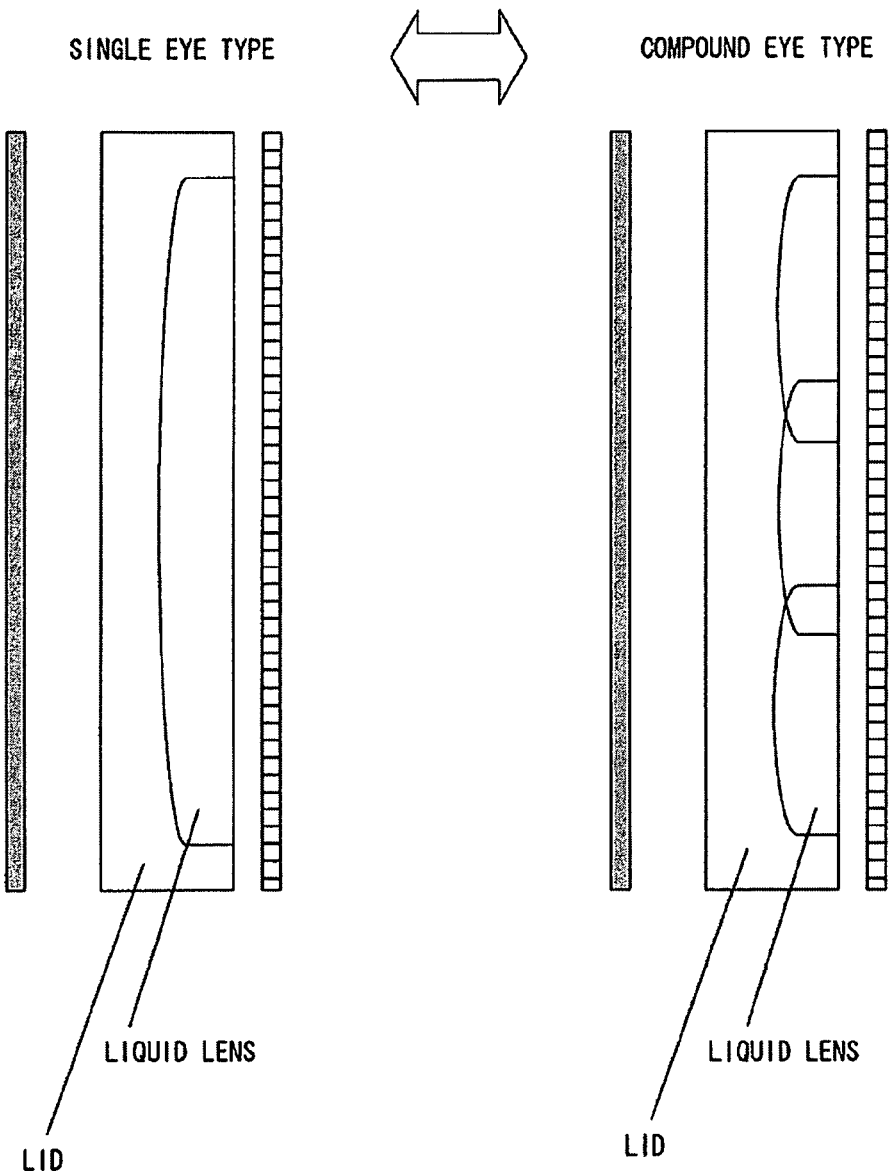
FIG. 17 is a schematic view showing a state in which the liquid lens unit is used as a lens for a single eye lens or lenses for a compound eye lens.

As shown in FIG. 17, an outer lid of the liquid lens for covering the liquid lens may be formed of a liquid, a gel-like substance or a gas having a smaller specific gravity than that of the liquid lens. For example, in the case of a liquid lens produced by VariOptics, the liquid lens is formed of water and the lid for covering the liquid lens is oil. Thus, a separation interface can be formed. It is preferable that the liquid lens further includes a phase transition control unit for allowing the liquid lens to exist as a liquid only at the time of switching and causing the liquid lens to exist as a solid except for the time of switching. Owing to this, after the phase transition, the influence by the gravitational force can be fixed.

The liquid lens may further include a phase transition control unit for allowing the liquid lens to exist as a gas only at the time of switching and causing the liquid lens to exist as a liquid or a solid except for the time of switching. Owing to this, the lens arrangement can be performed at high speed.

The liquid lens may be a single eye lens when the power is off. Owing to this, the liquid lens can be maintained more power-saving.

The liquid lens may be a compound eye lens when the power is off. Owing to this, the liquid lens can be maintained more power-saving.

The liquid lens may be shaped like a flat plate when the power is off. Owing to this, the liquid lens can be maintained more power-saving.

The liquid lens may be controllable to have a lens shape asymmetrical with respect to the center of each of the lenses, instead of a lens shape symmetrical with respect to the center of each of the lenses. Owing to this, the liquid lens can properly correct the distortion caused by a change of the lens shape or properly react when being influenced by acceleration due to a gravitational force or the like.

Figure 18:
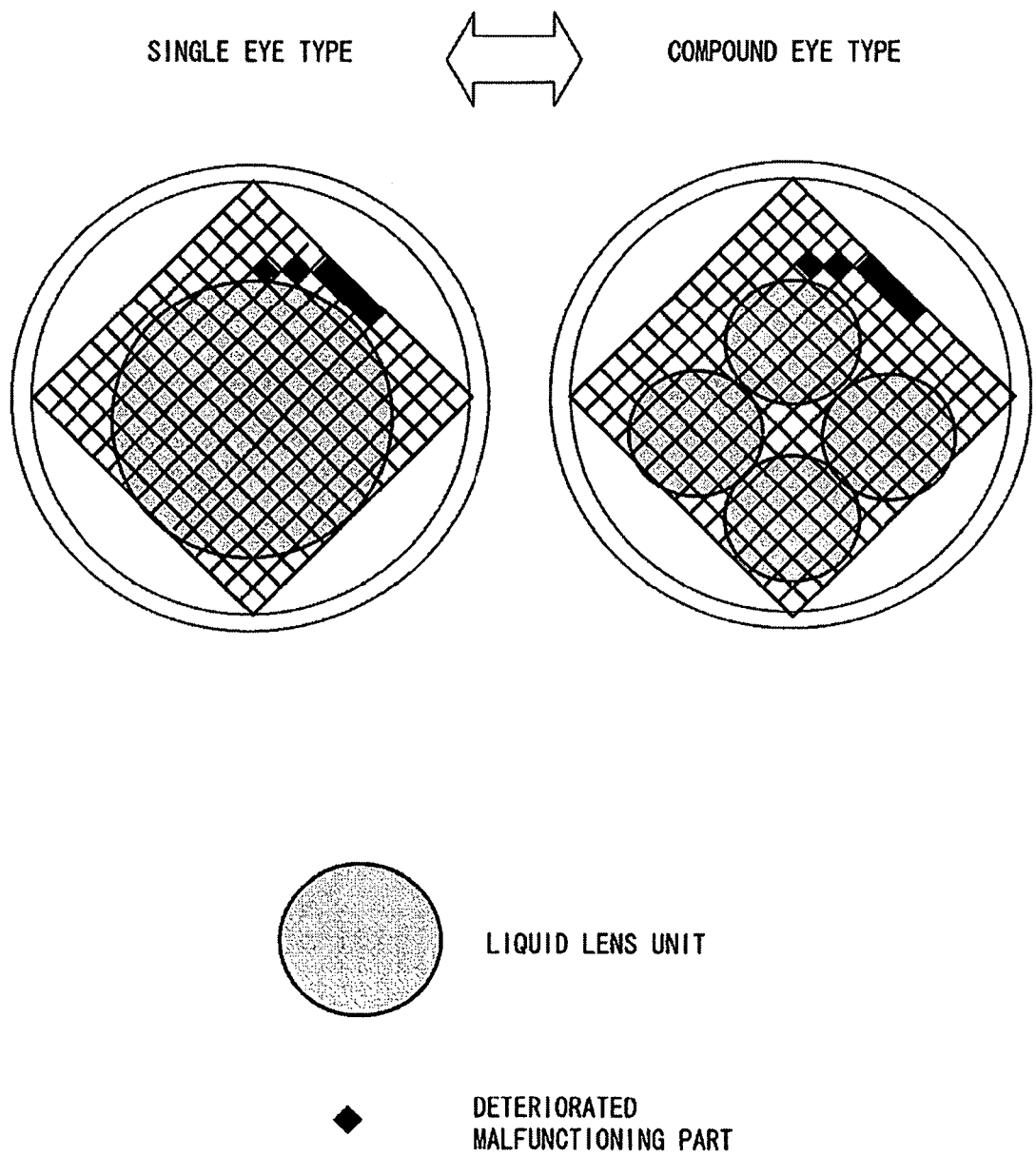
FIG. 18 is a schematic view showing a state in which the liquid lens unit is used as a lens for a single eye lens or lenses for a compound eye lens.

Regarding a switching unit for switching the liquid lens to a single eye lens or a compound eye lens, when a part of the area of the image pickup element, the part including the switching unit, malfunctions and a part of the image formed by the compound eye lens is not usable as shown in FIG. 18, the switching unit may locate the liquid lens only in a usable area of the image pickup element in order to take a planar image or a stereoscopic image. Thus, even when a part of the image pickup element malfunctions, the video image can be taken without missing anything.

The structures described in the above embodiments merely show specific examples and do not limit the technological scope of the present invention in any way. Any structure is usable within the scope in which the effect of the present invention is provided.

INDUSTRIAL APPLICABILITY

The present invention can provide a three-dimensional stereoscopic camera device having a liquid lens switchable to a single eye lens and a compound eye lens, and switching the liquid lens to the single eye lens to take a planar image and switching the liquid lens to the compound eye lens to take a stereoscopic image. Thus, this three-dimensional stereoscopic camera realizes a compound eye structure only by an electromagnetic control unit, without requiring a plurality of lenses to be mounted in advance, and is capable of taking a moving image or a still image. Owing to this, a switching operation to take a two-dimensional planar image or to take a three-dimensional stereoscopic image can be performed without a movable mechanism, and therefore the power consumption can be reduced and the reliability can be improved. In addition, a compact and lightweight camera is provided. The industrial applicability of the present invention is very high.

The invention claimed is:

1. A camera device, comprising:
a liquid lens switchable to a single eye lens and a compound eye lens; and
a switching unit for switching the liquid lens to the single eye lens to take a planar image and switching the liquid lens to the compound eye lens to take a stereoscopic image.

2. A camera device according to claim 1, wherein the switching unit, when switching the liquid lens to the compound eye lens, changes the number and locations of optical axes thereof.

3. A camera device according to claim 1, further comprising an optical axis control unit for changing an optical axis direction of the liquid lens, wherein the optical axis control unit changes the optical axis direction of the liquid lens in accordance with whether the liquid lens is switched to the single eye lens to take a planar image or the liquid lens is switched to the compound lens to take a stereoscopic image.

4. A camera device according to claim 1, wherein the switching unit controls the amount of light transmitted through the liquid lens to irradiate an image pickup element when switching the liquid lens to the single eye lens to take a planar image and when switching the liquid lens to the compound eye lens to take a stereoscopic image.

5. A camera device according to claim 1, further comprising a moving unit for changing a gap between an image pickup element and the liquid lens,
wherein the moving unit controls the gap between the image pickup element and the liquid lens.

6. A camera device according to claim 1, further comprising an electromagnetic control unit for performing the electromagnetic control by turning on or off, or increasing or decreasing, at least one of a voltage and a magnetic field in a diameter direction continuously in repetition, and generating a wave motion in the liquid by the electromagnetic control, to move the liquid, wherein
A liquid forming the liquid lens is moved between an inner circumferential area and an outer circumferential area, to switch the liquid lens to the single eye lens or the compound eye lens, by the wave motion generated by the electromagnetic control unit or a centrifugal force generated by rotating the liquid lens.

7. A camera device according to claim 1, wherein the switching unit concentrically moves the liquid forming the liquid lens between the inner circumferential area and the outer circumferential area so as to switch the liquid lens to the single eye lens or the compound eye lens and change a liquid amount distribution, thereby changing a light collection ratio of the liquid lens and thus controlling a sensitivity.

8. A camera device according to claim 7, wherein the liquid amount distribution is changed by changing the voltage applied to the inner circumferential area and the outer circumferential area of the liquid lens to change a shape of the liquid lens.

9. A camera device according to claim 1, wherein the switching unit, when switching the liquid lens to the compound eye lens, inscribes the liquid lens to an area of an image pickup element without overlapping.

10. A camera device according to claim 1, further comprising a video image input processing unit, wherein:
the switching unit, when switching the liquid lens to the compound eye lens, inscribes the liquid lens to an area of an image pickup element with partial overlapping; and
the video image input processing unit performs calculation processing on an input video image from the overlapped part to correct the video image of each lens.

11. A camera device according to claim 1, wherein the switching unit, when switching the liquid lens to the compound eye lens, circumscribes the liquid lens to an area of an image pickup element without overlapping.

12. A camera device according to claim 1, further comprising a video image input processing unit, wherein:
the switching unit, when switching the liquid lens to the compound eye lens, circumscribes the liquid lens to an area of an image pickup element with partial overlapping; and
the video image input processing unit performs calculation processing on an input video image from the overlapped part to correct the video image of each lens.

13. A camera device according to claim 1, further comprising a phase transition control unit for allowing the liquid lens to exist as a liquid only at the time of switching and causing the liquid lens to exist as a solid except for the time of switching.

14. A liquid lens according to claim 6, wherein the electromagnetic control is performed by turning on or off, or increasing or decreasing, at least one of a voltage and a magnetic field in a diameter direction continuously in repetition, and a wave motion is generated in the liquid by the electromagnetic control, to move the liquid.

15. An image pickup method using a liquid lens, by which:
the liquid lens is switched to a single eye lens or a compound eye lens;
a planar image is taken in the state where the liquid lens is switched to the single eye lens; and
a stereoscopic image is taken in the state where the liquid lens is switched to the compound eye lens.

* * * * *